United States Patent
Chono et al.

(10) Patent No.: US 8,743,956 B2
(45) Date of Patent: Jun. 3, 2014

(54) IMAGE ENCODING METHOD, DEVICE THEREOF, AND CONTROL PROGRAM THEREOF

(75) Inventors: Keiichi Chono, Tokyo (JP); Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 1592 days.

(21) Appl. No.: 10/598,154

(22) PCT Filed: Feb. 15, 2005

(86) PCT No.: PCT/JP2005/002243
§ 371 (c)(1),
(2), (4) Date: Aug. 18, 2006

(87) PCT Pub. No.: WO2005/081540
PCT Pub. Date: Sep. 1, 2005

(65) Prior Publication Data
US 2007/0140333 A1 Jun. 21, 2007

(30) Foreign Application Priority Data
Feb. 20, 2004 (JP) ................................. 2004-044011

(51) Int. Cl.
*H04N 7/12* (2006.01)
(52) U.S. Cl.
USPC .................................................. 375/240.12
(58) Field of Classification Search
USPC .................................................... 375/240.24
See application file for complete search history.

(56) References Cited

U.S. PATENT DOCUMENTS 4,683,494 A * 7/1987 Furukawa et al. ........ 375/240.12
5,724,097 A * 3/1998 Hibi et al. ................ 375/240.04
5,818,531 A * 10/1998 Yamaguchi et al. ....... 375/240.2
5,999,218 A 12/1999 Yokoyama (Continued)

FOREIGN PATENT DOCUMENTS

EP 1379090 A2 1/2004
EP 1564997 A1 8/2005

(Continued)

OTHER PUBLICATIONS

Chun-Hsien Chou, "Low Bit Rate 3-D Subband Video Coding Based on the Allocation of just Noticebale Distortion", Proceedings of the International Conference on Image Processing, vol. 1, XP010202146, pp. 637-640 (Sep. 1996).

(Continued)

*Primary Examiner* — Anner Holder
(74) *Attorney, Agent, or Firm* — Dickstein Shapiro LLP

(57) ABSTRACT

A block dead zone scale generator (202) receives an image signal and a prediction error, analyzes the pattern or prediction performance of a target block, and outputs a dead zone scale suitable for the pattern or prediction performance of the block. A dead zone generator (201) receives a dead zone scale from the block dead zone scale generator (202) and an MB quantization parameter from a quantization control device (103), calculates a dead zone width from the zone scale and the MB quantization parameter, and outputs the dead zone width. A quantization device (102) quantizes an orthogonal transformation coefficient supplied from an orthogonal transformation device (101) by using a dead zone from the dead zone generator (201), and outputs a quantized transformation coefficient. This makes it possible to realize quantization with arbitrary strength for each transformation coefficient and for each block comprising a plurality of transformation coefficients as constituent elements, thereby providing a high-quality image encoding technology.

9 Claims, 15 Drawing Sheets

(56) References Cited

U.S. PATENT DOCUMENTS

| | | | |
|---|---|---|---|
| 6,408,026 B1* | 6/2002 | Tao | 375/240.03 |
| 6,434,196 B1* | 8/2002 | Sethuraman et al. | 375/240.12 |
| 6,853,318 B1* | 2/2005 | Rabbani et al. | 341/50 |
| 2003/0026340 A1 | 2/2003 | Divakaran et al. | |
| 2004/0008899 A1* | 1/2004 | Tourapis et al. | 382/251 |
| 2007/0140333 A1 | 6/2007 | Chono et al. | |

FOREIGN PATENT DOCUMENTS

| | | |
|---|---|---|
| JP | 61-046685 A | 3/1986 |
| JP | 62-209984 A | 9/1987 |
| JP | 02-105792 A | 4/1990 |
| JP | 04-040118 A | 2/1992 |
| JP | 05-308629 A | 11/1993 |
| JP | 07-236142 A | 9/1995 |
| JP | 10-066079 A | 3/1998 |
| JP | 2003-230142 A | 8/2003 |
| WO | WO-2004/012136 A2 | 2/2004 |
| WO | WO-2005/081540 A1 | 9/2005 |

OTHER PUBLICATIONS

Syed et al., "Scalable Low Bit Rate Coding Using an HC-RIOT Coder", Conference Record of the Thirty-Third Asilomar Conference on Signals, Systems, and Computers, XP010373826, vol. 2, pp. 1208-1212 (Oct. 1999).

Gilles Gagnon, "Multiresolution Video Coding for HDTV", Canadian Conference on Electrical and Computer Engineering, XP010118038, pp. 19-22 (Sep. 1993).

Calvagno et al., "Modeling of Subband Image Data for Buffer Control", IEEE Transactions on Circuits and Systems for Video Technology, XP011014365, vol. 7, No. 2, pp. 402-408 (Apr. 1997).

Ribas-Corbera et al., "Rate Control in DCT Video Coding for Low Delay Communications", IEEE Transactions on Circuits and Systems for Video Technology, vol. 9, No. 1, XP011014544, pp. 172-185 (1999).

Westerink et al., IBM Journal of Research Development, vol. 43, No. 4, pp. 471-488 (1999).

Yoo et al.; "Adaptive Quantization of Image Subbands With Efficient Overhead Rate Selection"; IEEE International Conference o Image Processing, vol. 1, Sep. 16, 1996, pp. 361-364.

Przelaskowski, A.; "Statiscal Modeling and Treshold Selection of Wavelet Coefficients in Lossy Image Coder"; IEEE International Conference on Acoustics, Speech, and Signal Processing, vol. 6, Jun. 5, 2000, pp. 2055-2058.

Höntsch, Ingo, S. et al.; "Locally-Adaptive Perceptual Quantization without Side Information for DCT Coefficients"; IEEE Signals, Systems & Computers, Asiloma Conference, vol. 2, Nov. 2, 1997, pp. 995-999.

Joshi, Rajan L. et al.; "Optimum Classification in Subband Coding of Images"; IEEE International Conference on Image Processing, vol. 2, Nov. 13, 1994, pp. 883-887.

Extended Search Report issued for EP 13 16 0117, date of completion May 27, 2013.

* cited by examiner

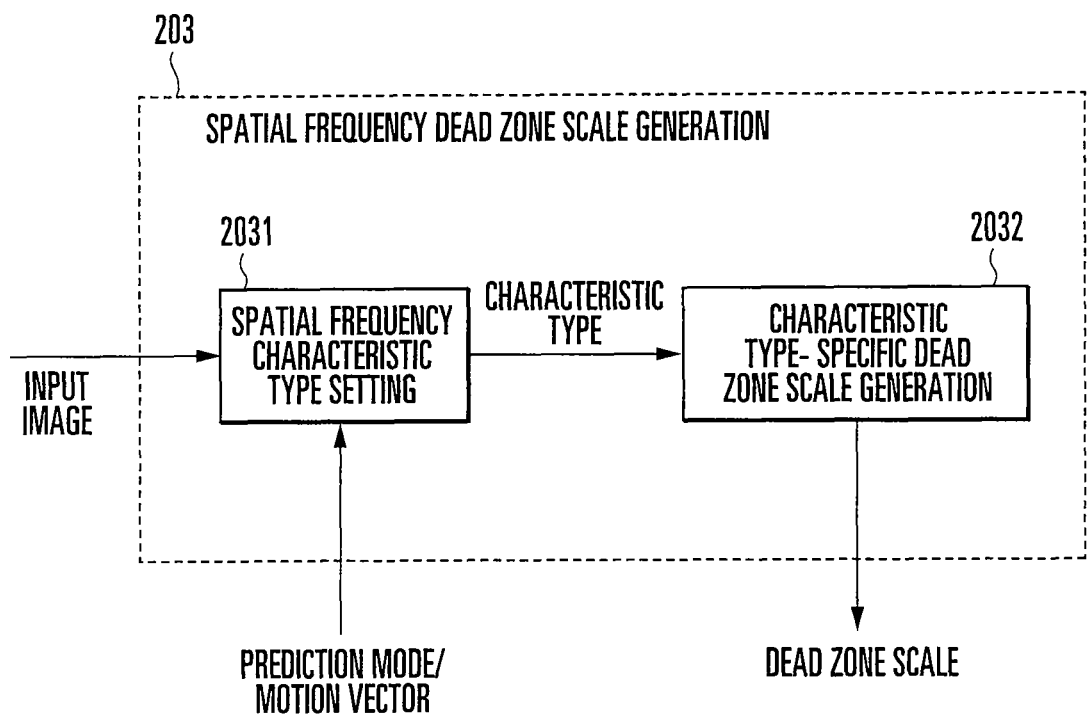
F I G. 12

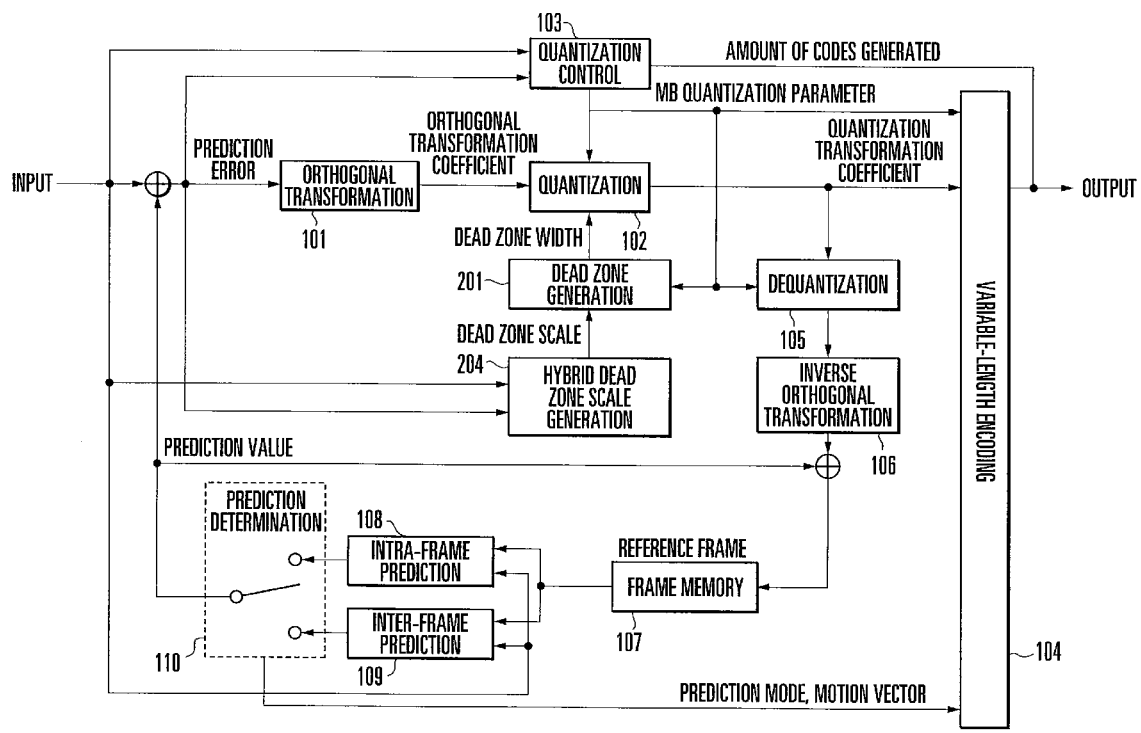
F I G. 16

IMAGE ENCODING METHOD, DEVICE THEREOF, AND CONTROL PROGRAM THEREOF

TECHNICAL FIELD

The present invention relates to an image encoding method, a device thereof, and a control program thereof and, more particularly, to an image encoding method of performing adaptive quantization for an improvement in subjective image quality, a device thereof, and a control program thereof.

BACKGROUND ART

A conventional technique will be described with reference to the accompanying drawings.

Hybrid moving image encoding as a conventional technique based on an orthogonal transformation device and a prediction device (intra-frame prediction/inter-frame prediction) will be described below with reference to FIG. 1.

According to the conventional technique, an image frame forming a moving image is divided into a plurality of areas called macroblocks (MBs), and each block obtained by further dividing each MB is encoded. FIG. 2 shows the arrangement of an AVC (Advanced Video Coding: ISO/IEC 14496-10) image frame as a concrete example of the arrangement of an image frame according to the conventional technique.

A prediction value supplied from an intra-frame prediction device 5108 which performs prediction from inside the same image frame reconstructed in the past or an inter-frame prediction device 5109 which performs prediction from a past image frame reconstructed in the past is subtracted from the above MB. The MB signal from which the prediction value has been subtracted is called a prediction error signal.

The above prediction error signal is divided into smaller blocks (to be simply referred to as blocks hereinafter), and each block is transformed from a spatial domain into a frequency domain by an orthogonal transformation device 5101.

A quantization device 5102 quantizes the orthogonal transformation coefficients of the block, which has been transformed into the above frequency domain, with a quantization step size corresponding to the quantization parameter supplied from a quantization control device 5103 for each MB.

In general, the quantization control device 5103 monitors the amount of codes generated. If the amount of codes generated is larger than a target code amount, the quantization control device 5103 increases the quantization parameter. If the amount of codes generated is smaller than the target code amount, the quantization control device 5103 decreases the quantization parameter. This makes it possible to encode a moving image with the target code amount.

The quantized orthogonal transformation coefficient is called a quantized transformation coefficient. This coefficient is entropy-encoded by a variable-length encoder 5104 and is output.

For subsequent encoding, the above quantized transformation coefficient is dequantized by a dequantization device 5105, and is further subjected to inverse orthogonal transformation by an inverse orthogonal transformation device 5106 to be restored to the original spatial domain.

The above prediction value is added to the block restored to the spatial domain, and the resultant data is stored in a frame memory 5107. An image frame reconstructed by the stored block will be referred to as a reference frame.

The intra-frame prediction device 5108 detects a prediction direction in which the prediction error signal of the current MB is minimized from the reference frame. The inter-frame prediction device 5109 detects a motion vector with which the prediction error signal of the current MB is minimized from the reference frame. A prediction determination switch 5110 compares a prediction error due to the above intra-frame prediction with a prediction error due to the inter-frame prediction, and selects a prediction corresponding to a smaller prediction error.

In order to maintain the subjective image quality of a moving image compressed by the above processing, the quantization control device 5103 monitors input image signals and prediction error signals in addition to the amount of codes generated. If the visual sensitivity of an MB to be quantized is high, the quantization control device 5103 decreases the quantization parameter (performs finer quantization). If the visual sensitivity is low, the quantization control device 5103 increases the quantization parameter (performs coarser quantization) (the finer the quantization, the higher the image quality).

In a conventional technique such as AVC, there is a restriction that only one quantization parameter is allowed to be transmitted to one MB in order to reduce the information amount of quantization parameter to be transmitted.

Owing to this restriction, all the orthogonal transformation coefficients (256 coefficients in the case of a luminance signal) of the blocks constituting an MB are quantized with the same quantization width, i.e., the same quantization characteristic.

The conventional technique therefore has the following three problems.

The first problem is that the respective blocks constituting an MB do not necessarily have the same pattern. In such a case, the conventional technique cannot perform quantization suitable for the pattern of each block constituting an MB.

The second problem is that in moving image encoding operation in which each block constituting an MB allows independent intra-frame prediction or each block constituting an MB allows inter-frame prediction using an independent vector, the performance of minimizing a prediction error (to be referred to as prediction performance hereinafter) varies for each block constituting an MB. In such a case, the conventional technique cannot perform quantization suitable for the prediction performance of each block constituting an MB.

The third problem is that the distribution of orthogonal transformation coefficients corresponding to the coordinates (to be referred to as spatial frequencies hereinafter) in a block varies due to the first and second reasons, and the respective blocks constituting an MB do not exhibit a uniform distribution. In such a case, the conventional technique cannot perform quantization suitable for the distribution of the orthogonal transformation coefficients of each block.

Owing to these problems, in the conventional technique, a quantization parameter for an MB cannot help but be determined in accordance with the highest visual sensitivity in a frequency domain in the MB or a block exhibiting the highest visual sensitivity in a spatial zone in the MB. As a consequence, other transformation coefficients exhibiting low visual sensitivity in a frequency domain, or a block exhibiting low visual sensitivity in a spatial domain is quantized more finely than necessary. That is, unnecessary information amounts are assigned to transformation coefficients exhibiting low visual sensitivity.

Japanese Patent Laid-Open No. 2003-230142 (reference 1) discloses a technique of improving the average subjective image quality of an entire image frame without transmitting any quantization characteristic additional information by clipping high-frequency transformation coefficients of the transformation coefficients in all the blocks constituting an MB in intra-frame prediction more than low-frequency transformation coefficients, and inhibiting the above coefficients from being clipped in inter-frame prediction.

DISCLOSURE OF INVENTION

Problem to be Solved by the Invention

According to a method of setting the same quantization parameter for a plurality of transformation coefficients or a set of blocks each comprising a plurality of transformation coefficients as constituent elements as in the conventional technique, quantization suitable for the pattern of a block, the prediction performance of the block, and the distributions of the transformation coefficients of the block cannot be performed. However, in a method of setting and transmitting quantization parameters for the respective transformation coefficients or the respective blocks each comprising a plurality of transformation coefficients as constituent elements, the code amount of quantization parameter (to be referred to as quantization characteristic additional information hereinafter) becomes enormous. This technique cannot therefore be used for image encoding with a predetermined code amount.

In addition, the technique disclosed in reference 1 cannot implement quantization in accordance with the pattern of each block as the minimum constituent element of an image frame (i.e., each block constituting an MB)/the prediction performance of each block/the distribution of the coefficients in each block. As a consequence, local image quality deterioration occurs in an image frame. That is, problems 1, 2, and 3 described above cannot be solved.

The present invention has been made in consideration of the above problems, and has as its object to provide a high-quality image encoding technique which can implement quantization with flexible strength for each transformation coefficient and for each block comprising a plurality of transformation coefficients as constituent elements without using any quantization characteristic additional information.

In addition, it is an object of the present invention to enable quantization in accordance with the visual sensitivity of a transformation coefficient in a frequency domain and provide high-quality images without adding any information to a bit stream in a transform encoding technique of quantizing a plurality of transformation coefficients with the same quantization width.

Furthermore, it is an object of the present invention to enable quantization in accordance with the visual sensitivity of a block in a spatial domain and provide higher-quality images without adding any information to a bit stream in an image transform encoding technique of quantizing a set of blocks each comprising a plurality of transformation coefficients as constituent elements with the same quantization width.

Means of Solution to the Problem

In order to solve the above problems, an image encoding method according to the present invention is characterized by comprising the steps of generating a transformation coefficient by transforming an image from a spatial domain into a frequency domain, and quantizing the transformation coefficient by using the same quantization width as that at the time of decoding with a quantization characteristic different from a quantization characteristic at the time of decoding.

In addition, an image encoding device according to the present invention is characterized by comprising transformation means for generating a transformation coefficient by transforming an image from a spatial domain into a frequency domain, and quantization means for quantizing the transformation coefficient by using the same quantization width as that at the time of decoding with a quantization characteristic different from a quantization characteristic at the time of decoding.

Furthermore, an image encoding control program according to the present invention is characterized by causing a computer to function as transformation means for generating a transformation coefficient by transforming an image from a spatial domain into a frequency domain, and quantization means for quantizing the transformation coefficient by using the same quantization width as that at the time of decoding with a quantization characteristic different from a quantization characteristic at the time of decoding.

Effects of the Invention

The present invention comprises a means for setting a dead zone width corresponding to the visual sensitivity of a transformation coefficient in a frequency domain or the visual sensitivity of a block comprising a plurality of transformation coefficients as constituent elements in a spatial domain in the transform encoding technique for images. This makes it possible to provide a quantization function corresponding to the visual sensitivity of a transformation coefficient in a frequency domain and the visual sensitivity of a block comprising a plurality of transformation coefficients as constituent elements in a spatial domain.

The present invention can reduce the amount of codes wastefully consumed for a transformation coefficient with low visual sensitivity in a frequency domain and a block with low visual sensitivity in a spatial domain independently of the quantization width determined by a quantization parameter. Reducing the amount of codes makes it possible to quantize an entire image frame more finely than in the conventional scheme and encode a transformation coefficient with high visual sensitivity in a frequency domain and a block with high visual sensitivity in a spatial domain with high image quality.

BRIEF DESCRIPTION OF DRAWINGS

FIG. 12 is a view showing an example of the arrangement of a spatial frequency dead zone scale generator;

FIG. 16 is a view showing an example of the arrangement of the third embodiment;

BEST MODE FOR CARRYING OUT THE INVENTION

Figure 1:
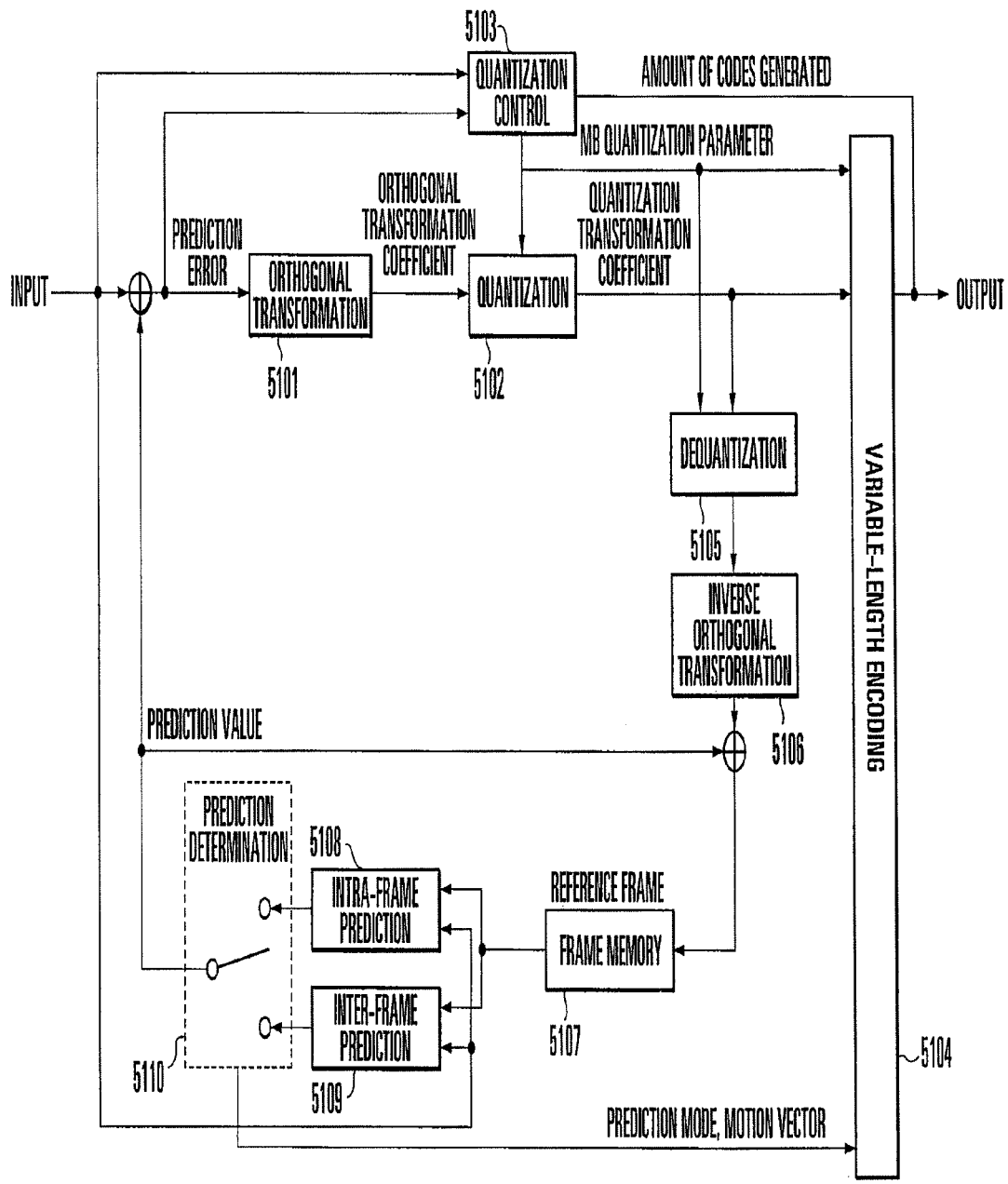
FIG. 1 is a view showing the arrangement of a conventional technique.
Figure 2:
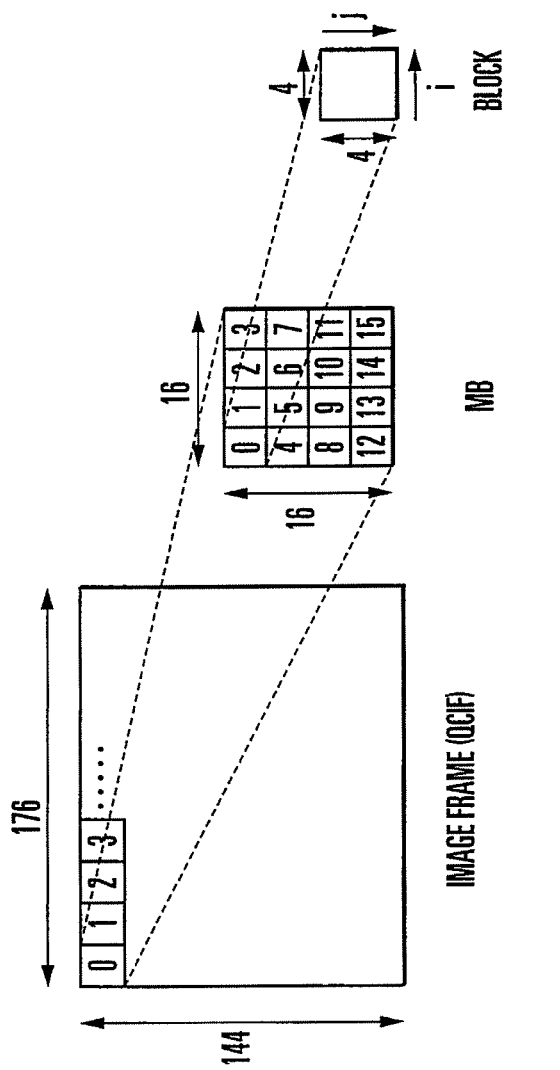
FIG. 2 is view showing an image frame (only a luminance signal when the resolution is QCIF)
Figure 3:
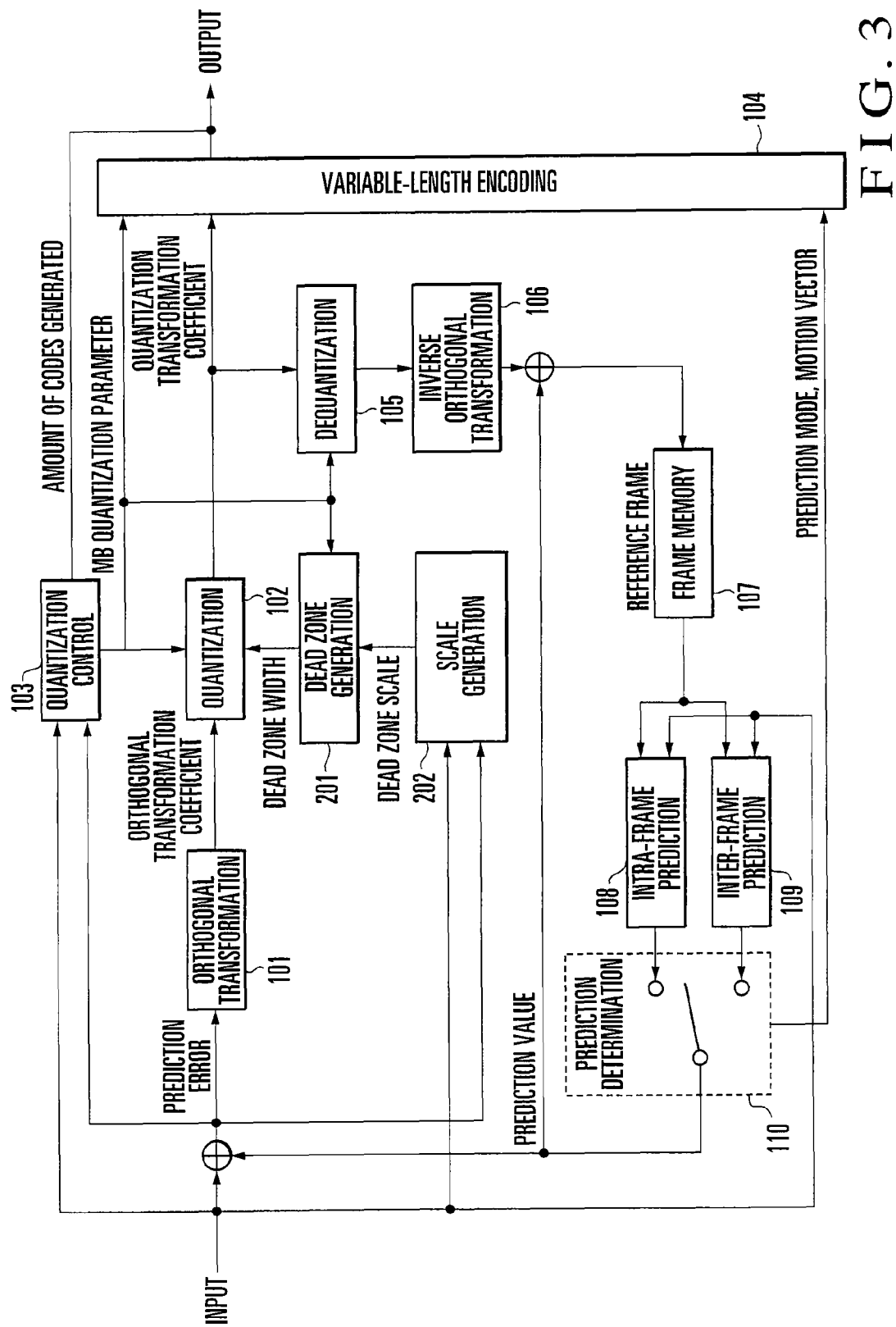
FIG. 3 is a view showing an example of the arrangement of the first embodiment.

According to the present invention, in image encoding, for example, as shown in FIG. 3, each transformation coefficient is quantized with a quantization characteristic different from a quantization characteristic at the time of decoding by quantizing each transformation coefficient using a dead zone with the same quantization width as that set at the time of decoding by using a dead zone generator 201 and a block dead zone scale generator 202.

In addition, a quantization function corresponding to the visual sensitivity of a transformation coefficient in the frequency domain and the visual sensitivity of a block comprising a plurality of transformation coefficients as constituent elements in a spatial domain is provided by adaptively changing a dead zone width for each transformation coefficient or for each block comprising a plurality of transformation coefficients as constituent elements. The amount of codes can further be reduced.

More specifically, the dead zone width is set to be smaller for transformation coefficients with higher visual sensitivity in a frequency domain or blocks with higher visual sensitivity in a spatial domain, and is set to be larger for transformation coefficients with lower visual sensitivity in the frequency domain or blocks with lower visual sensitivity in the spatial domain. In addition, the width of the dead zone is adaptively changed in accordance with the flatness of an image. In this case, the flatness of an image is calculated from at least one of the prediction mode of the image, the direction of the intra-frame prediction of the image, the motion of the image, the direction of the inter-frame prediction of the image, the average absolute error of the image, the variance of the image, the difference between the maxim and minimum values of the image, the average absolute error of the prediction error signal of the image, and the variance of the prediction error signal of the image.

Concrete embodiments will be described below.

First Embodiment

The first embodiment of the present invention will be described.

FIG. 3 shows an example of the arrangement of the first embodiment.

In this embodiment, an image frame forming a moving image is divided into a plurality of areas called macroblocks (MBs), and each block obtained by further dividing each MB is encoded.

A prediction value supplied from an intra-frame prediction device 108 which performs prediction from inside the same image frame reconstructed in the past or an inter-frame prediction device 109 which performs prediction from a past image frame reconstructed in the past is subtracted from the above MB. The MB signal from which the prediction value has been subtracted is called a prediction error signal.

The above prediction error signal is divided into smaller blocks (to be simply referred to as blocks hereinafter), and each block is transformed from a spatial domain into a frequency domain by an orthogonal transformation device 101.

A quantization device 102 quantizes the orthogonal transformation coefficients of the block, which has been transformed into the above frequency domain, with a quantization step size corresponding to a quantization parameter.

Quantization parameters are supplied from a quantization control device 103 to the quantization device 102 for each MB. In general, the quantization control device 103 monitors the amount of codes generated. If the amount of codes generated is larger than a target code amount, the quantization control device 103 increases the quantization parameter. If the amount of codes generated is smaller than the target code amount, the quantization control device 103 decreases the quantization parameter. This makes it possible to encode a moving image with the target code amount.

The orthogonal transformation coefficient which has been quantized is called a quantized transformation coefficient. This coefficient is entropy-encoded by a variable-length encoder 104 and is output.

For subsequent encoding, the above quantized transformation coefficient is dequantized by a dequantization device 105, and is further subjected to inverse orthogonal transformation by an inverse orthogonal transformation device 106 to be restored to the original spatial domain.

The above prediction value is added to the block restored to the spatial domain, and the resultant data is stored in a frame memory 107. An image frame reconstructed by the stored block will be referred to as a reference frame.

The intra-frame prediction device 108 detects a prediction direction in which the prediction error signal of the current MB is minimized from the reference frame. The inter-frame prediction device 109 detects a motion vector with which the prediction error signal of the current MB is minimized from the reference frame. A prediction determination switch 110 compares a prediction error due to the above intra-frame prediction with a prediction error due to the inter-frame prediction, and selects a prediction corresponding to a smaller prediction error.

In addition, in this embodiment, the quantization device 102 uses a dead zone when quantizing an orthogonal transformation coefficient supplied from the orthogonal transformation device 101. The dead zone is a zone in which an output corresponding to an input near 0 (zero) is made 0 (zero). An input range in which such operation is performed is called a dead zone width. In this case, if an orthogonal transformation coefficient is included in the dead zone width, the quantization device 102 makes the output obtained by quantizing the orthogonal transformation coefficient, i.e., a quantized transformation coefficient, 0 (zero).

A dead zone width is generated by a dead zone generator 201 and a block dead zone scale generator 202.

The block dead zone scale generator 202 receives an image signal and a prediction error, analyzes the pattern or prediction performance of a target block, and outputs a dead zone scale suitable for the pattern or prediction performance of the block to the dead zone generator 201.

The dead zone generator 201 receives the dead zone scale from the block dead zone scale generator 202 and an MB quantization parameter from the quantization control device 103, calculates a dead zone width from the dead zone scale and MB quantization parameter, and outputs the dead zone width to the quantization device 102. More specifically, the dead zone width is obtained by multiplying the dead zone scale by the MB quantization parameter. The dead zone scale is therefore a coefficient for an MB quantization parameter which is used to obtain a dead zone width.

For a concrete explanation, assume that in the following description, the size of an image frame is a QCIF (176×144) size, the size of an MB is a 16×16 size, and the size of a block is a 4×4 size. Obviously, however, the present invention can be applied to a case wherein other sizes are used.

The dead zone generator 201 as a characteristic feature of this embodiment and the quantization device 102 accompanied by changes in internal operation which are made by the block dead zone scale generator 202 and the dead zone generator 201 will be described below.

The input/output and operation of the dead zone generator 201 will be described below.

Inputs to the dead zone generator 201 are a dead zone scale dz_scale(b,i,j) (0≤b≤15, 0≤i≤3, 0≤j≤3) corresponding to the bth block in the raster scan order in the MB currently processed by the quantization device 102 and a quantization parameter mb_q supplied from the quantization control device 103.

An output from the dead zone generator 201 is a dead zone width dz(b,i,j) (0≤b≤15, 0≤i≤3, 0≤j≤3) corresponding to an orthogonal transformation coefficient cof(b,i,j) (0≤b≤15, 0≤i≤3, 0≤j≤3) of the bth block in the raster scan order in the MB currently processed by the quantization device 102.

Figure 4:
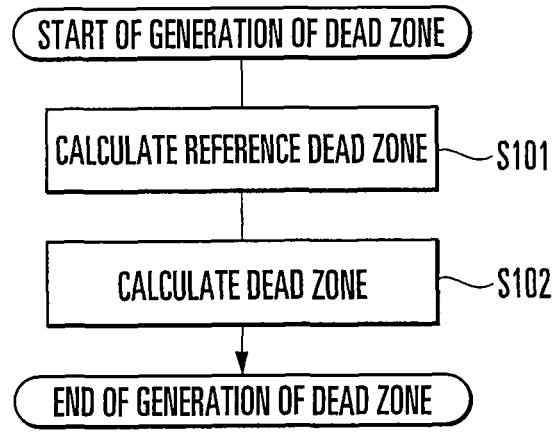
FIG. 4 is a flowchart for the generation of a dead zone.

The operation of the dead zone generator 201 will be described below with reference to FIG. 4.

In step S101, a reference dead zone base_dz(i,j) (0≤i≤3, 0≤j≤3) is calculated from the quantization parameter mb_q. A reference dead zone calculation method to be used changes depending on whether an encoder to which the present invention is connected (to be referred to as a base encoder hereinafter) uses a quantization matrix WM(i,j) (0≤i≤3, 0≤j≤3). A quantization matrix is a weighting parameter (quantization additional information) corresponding to a spatial frequency in division in quantization and multiplication in dequantization. Using the quantization matrix makes it possible to change the quantization width for each spatial frequency. A step to be executed when the quantization matrix is used and a step to be executed when the quantization matrix is not used will be described as steps S101A and S101B, respectively. Note that a quantization step size mb_q_step to be commonly used below is set by mb_q_step=q_step_table[q]. The quantization step size q_step_table[q] is a quantization step size corresponding to a quantization parameter q defined by the base encoder (Q_MIN≤p≤Q_MAX; both Q_MIN and Q_MAX depend on the base encoder).

In step S101A, a reference dead zone base_dz(i,j) is calculated by equation (1):

$$\text{base\_}dz(i,j) = mb\_q\_step \times WM(i,j) \quad (1)$$

In step S101B, the reference dead zone base_dz(i,j) is calculated by equation (2):

$$\text{base\_}dz(i,j) = mb\_q\_step \quad (2)$$

In step S102, a dead zone width dz(i,j) is calculated from the reference dead zone base_dz(i,j) and the dead zone scale dz_scale(b,i,j) according to equation (3):

$$dz(b,i,j) = \text{base\_}dz(i,j) \times dz\_scale(b,i,j) \quad (3)$$

Note that the dead zone width dz(b,i,j) can be arbitrarily set by the value of the dead zone scale dz_scale(b,i,j).

The input/output and operation of the dead zone generator 201 have been described above.

The dead zone scale generator 202 generates a dead zone scale suitable for the pattern or prediction performance of each block for each block comprising a plurality of transformation coefficients as constituent elements.

The input/output and operation of the block dead zone scale generator 202 will be described below.

Inputs to the block dead zone scale generator 202 are an input image signal org(b,i,j) (0≤b≤15, 0≤i≤3, 0≤j≤3) corresponding to the bth block in the raster scan order in the MB currently processed by the quantization device 102 and a prediction error signal pd(b,i,j) (0≤b≤15, 0≤i≤3, 0≤j≤3).

In this case, the bit accuracy of an input signal corresponds to n bits without any code.

An output from the block dead zone scale generator 202 is the dead zone scale dz_scale(b,i,j) (0≤b≤15, 0≤i≤3, 0≤j≤3) corresponding to the bth block in the raster scan order in the MB currently processed by the quantization device 102.

The signal used by the block dead zone scale generator 202 to generate a dead zone scale is an image feature amount signal imf(b,i,j) (0≤b≤15, 0≤i≤3, 0≤j≤3).

Figure 5:
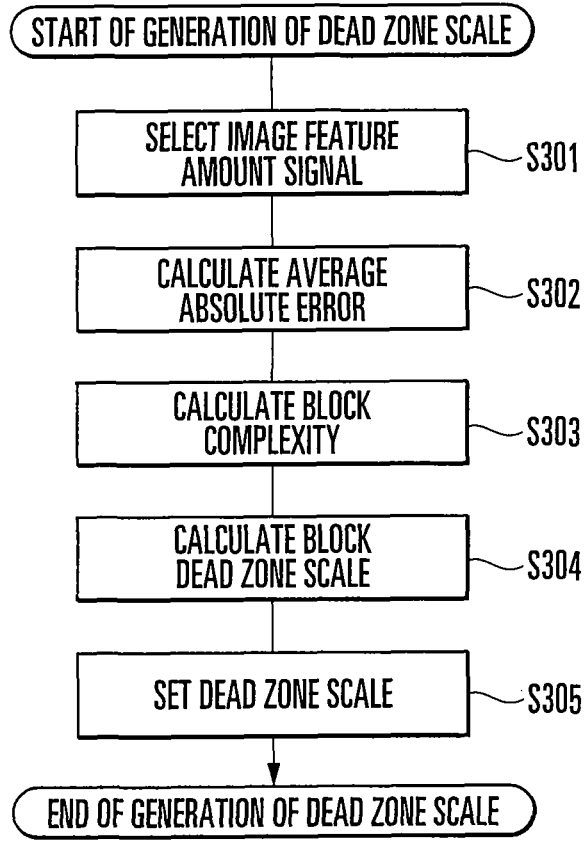
FIG. 5 is a flowchart for the generation of a block dead zone scale.

The operation of the block dead zone scale generator 202 will be described with reference to FIG. 5.

In step S301, an image feature amount signal is selected. There are the following three kinds of choices:

1 (C301A) When the quantization device 102 of the base encoder determines a quantization parameter by using an input image signal in addition to the amount of codes generated, the input image signal org(b,i,j) is connected to the image feature amount signal imf(b,i,j).

2 (C301B) When the quantization device 102 of the base encoder determines a quantization parameter by using a prediction error signal pd in addition to the amount of codes-generated and an input image signal, a prediction error signal pd(b,i,j) is connected to the image feature amount signal imf(b,i,j).

3 (C301C) In a case other than C301A and C301B, the input image signal org(b,i,j) is connected to the image feature amount signal imf(b,i,j).

In step S302, an average absolute error L1AC(b) (0≤b≤15) corresponding to each block number b (0≤b≤15) is calculated by equations (4) and (5):

$$L1AC(b) = \frac{1}{16} \times \sum_{j=0}^{3} \sum_{i=0}^{3} \text{abs}(imf(b, i, j) - ave) \quad (4)$$

$$ave = \frac{1}{16} \times \sum_{j=0}^{3} \sum_{i=0}^{3} imf(b, i, j) \quad (5)$$

In this case, abs(x) is a function of returning the absolute value of an input x, and the average absolute error L1AC(b) (1≤L1AC(b)≤n) represents the dispersion of an image feature amount signal in the block b.

In step S303, a block complexity bcm(b) (0≤b≤15) corresponding to each block number b (0≤b≤15) is calculated by using equation (6):

$$bcm(b) = \max\left(1.0, \frac{n}{2^n - 1} \times L1AC(b)\right) \quad (6)$$

where max(x,y) is a function of returning a larger one of the values of the inputs x and y.

As the block complexity bcm(b) (1≤bcm(b)≤n) decreases, the block is flatter, and the human visual sensitivity is higher. In addition, as the block complexity bcm(b) increases, the block becomes more complex, and the human visual sensitivity is lower.

In consideration of this phenomenon, a quantization strength can be set in accordance with the visual sensitivity (pattern or prediction performance) of a block in a spatial domain by decreasing the quantization strength of the block as the block complexity decreases, and vice versa.

In step S304, a block dead zone scale bdz_scale(b) (0≤b≤15) corresponding to each block number b (0≤b≤15) is calculated by using equation (7):

$$bdz\_scale(b) = clip(bdz\_limit, (bcm(b)/min\_bcm)) \quad (7)$$

$$min\_bcm = min(bcm(b)) \quad (8)$$

where bdz_limit is a parameter smaller than n, clip(x,y) is a function of returning a smaller one of the values of the inputs x and y, and min(bcm(b)) is a function of returning the minimum value of bcm(b) (1≤bcm(b)≤n). Decreasing bdz_limit makes it possible to reduce a change in quantization strength for each block. Increasing bdz_limit makes it possible to dynamically change the quantization strength for each block.

Note that a dead zone scale is to be calculated upon taking into consideration complexity around a block as well, equation (7A) may be used instead of equation (7):

$$bdz\_scale(b) = clip(bdz\_limit, (local\_bcm(b)/min\_local\_bcm)) \quad (7A)$$

$$min\_local\_bcm = min(local\_bcm(b)) \quad (8A)$$

where local_bcm(b) is a function of returning the minimum bcm value of the target block b and neighboring blocks, and min(local_bcm(b)) is a function of returning the minimum value of local_bcm(b) (1≤bcm(b)≤n).

In step S305, the block dead zone scale bdz_scale(b) is set in the dead zone scale dz_scale(b,i,j) (0≤b≤15, 0≤i≤3, 0≤j≤3) corresponding to each block number b (0≤b≤15) by using equation (9):

$$dz\_scale(b,i,j) = bdz\_scale(b) \ldots (0 \le i \le 3, 0 \le j \le 3) \quad (9)$$

With the above operation of the block dead zone scale generator 202, the dead zone scale dz_scale is decreased as the visual sensitivity of a bock in a spatial zone increases, and vice versa.

Note that if the input image signal org(b,i,j) is connected to the image feature amount signal f(b,i,j), the pixel range (the difference between the maximum and minimum pixel values) of a block may be used instead of an average absolute error. That is, it suffices to use any information from which the complexity of a block can be obtained.

The input/output and operation of the block dead zone scale generator 202 have been described above.

The input/output and operation of the quantization device 102 will be described below.

Inputs to the quantization device 102 are a dead zone width dz(b,i,j) (0≤b≤15, 0≤i≤3, 0≤j≤3) supplied from the dead zone generator 201, an orthogonal transformation coefficient cof (b,i,j) (0≤b≤15, 0≤i≤3, 0≤j≤3) supplied from the orthogonal transformation device 101, and a quantization parameter mb_q supplied from the quantization control device 103.

An output from the quantization device 102 is a quantized transformation coefficient q_cof(b,i,j) (0≤b≤15, 0≤i≤3, 0≤j≤3).

Only the dead zone width dz(b,i,j) (0≤b≤15, 0≤i≤3, 0≤j≤3) is added as an input to the conventional arrangement. However, owing to the influence of operation to be described below, the output value of the quantized transformation coefficient q_cof(b,i,j) differs from that in the conventional scheme.

Figure 6:
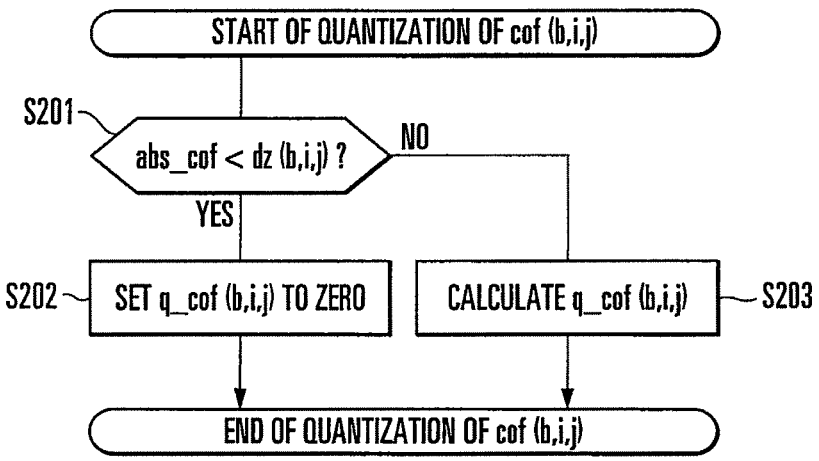
FIG. 6 is a flowchart for quantization of one orthogonal transformation coefficient.

The operation of the quantization device 102 will be described below with reference to FIG. 6.

In step S201, it is checked by comparison whether the absolute value abs_cof of the orthogonal transformation coefficient cof(b,i,j) is smaller than the dead zone width dz(b,i,j). If YES in step S201, the flow advances to step S202; otherwise, to step S203.

In step S202, the quantized transformation coefficient q_cof(b,i,j) is set to 0.

In step S203, the quantized transformation coefficient q_cof(b,i,j) is obtained by the following calculation method.

The quantized transformation coefficient calculation method to be used changes depending on whether the base encoder uses a quantization matrix WM(i,j) (0≤i≤3, 0≤j≤3). A step to be executed when the quantization matrix is used and a step to be executed when the quantization matrix is not used will be described as steps S203A and S203B, respectively.

A quantization step size mb_q_step to be commonly used below is set by mb_q_step=q_step_table[q]. The quantization step size q_step_table[q] is a quantization step size corresponding to a quantization parameter q defined by the base encoder (Q_MIN≤p≤Q_MAX; both Q_MIN and Q_MAX depend on the base encoder).

In step S203A, the quantized transformation coefficient q_cof(b,i,j) is calculated by equation (10A):

$$q\_cof(b, i, j) = \begin{cases} qc & \text{if } (cof(b, i, j) \ge 0) \\ -qc & \text{else} \end{cases} \quad (10A)$$

$$qc = (abs(cof(b, i, j)) + f \times (WM(i, j) \times mb\_q\_step)) / (WM(i, j) \times mb\_q\_step) \quad (11A)$$

where abs(x) is a function of returning the absolute value of the input x, and f is a parameter of less than 1 which depends on the base encoder. If this parameter is rounded off, it is set to 0.5. If the parameter is rounded down, it is set to 0.

In step S203B, the quantized transformation coefficient q_cof(b,i,j) is calculated by equation (10B):

$$q\_cof(b, i, j) = \begin{cases} qc & \text{if } (cof(b, i, j) \geq 0) \\ -qc & \text{else} \end{cases} \quad (10B)$$

$$qc = (abs(cof(b, i, j)) + f \times mb\_q\_step) / mb\_q\_step \quad (11B)$$

where abs(x) is a function of returning the absolute value of the input x, and f is a parameter of less than 1 which depends on the base encoder. If this parameter is rounded off, it is set to 0.5. If the parameter is rounded down, it is set to 0.

When the above processing is applied to all the orthogonal transformation coefficients cof(b,i,j) ($0 \leq i \leq 3$, $0 \leq j \leq 3$) in an MB, quantization of one MB is complete.

The input/output and operation of the quantization device 102 have been described above.

The effects of the present invention will be described below.

The principle of changing quantization strength by changing a dead zone will be described first.

Figure 8:
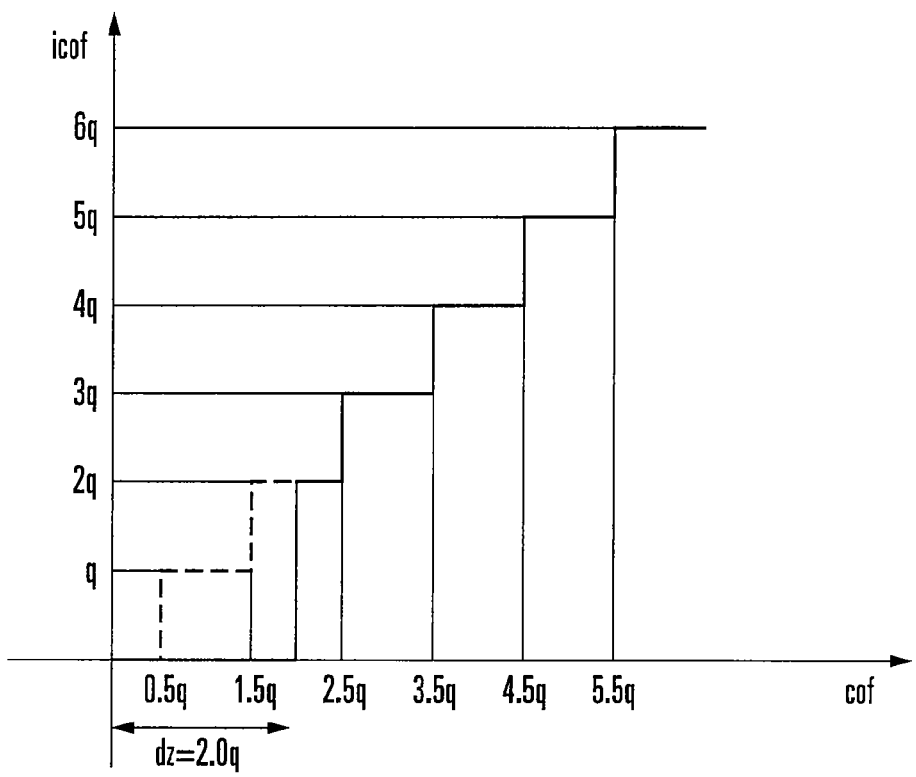
FIG. 8 is a view showing a quantization characteristic (quantization step size q, dead zone width dz=2q) according to the present invention.
Figure 9:
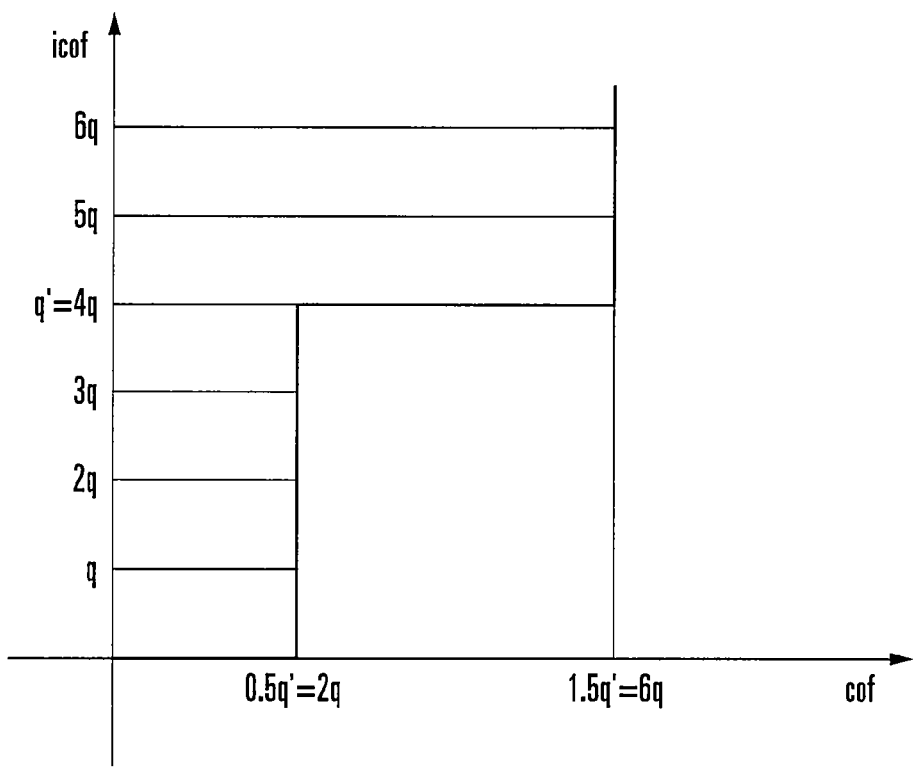
FIG. 9 is a view showing a quantization characteristic (quantization step size q'=4q) in the conventional scheme.

A difference in quantization characteristic based on the dead zone dz (when no quantization matrix is set in the base encoder, and f is 0.5) will be described with reference to FIGS. 7, 8, and 9. A quantization characteristic means the relationship between an input cof to the quantization device 102 and an output cof from the dequantization device 105.

Figure 7:
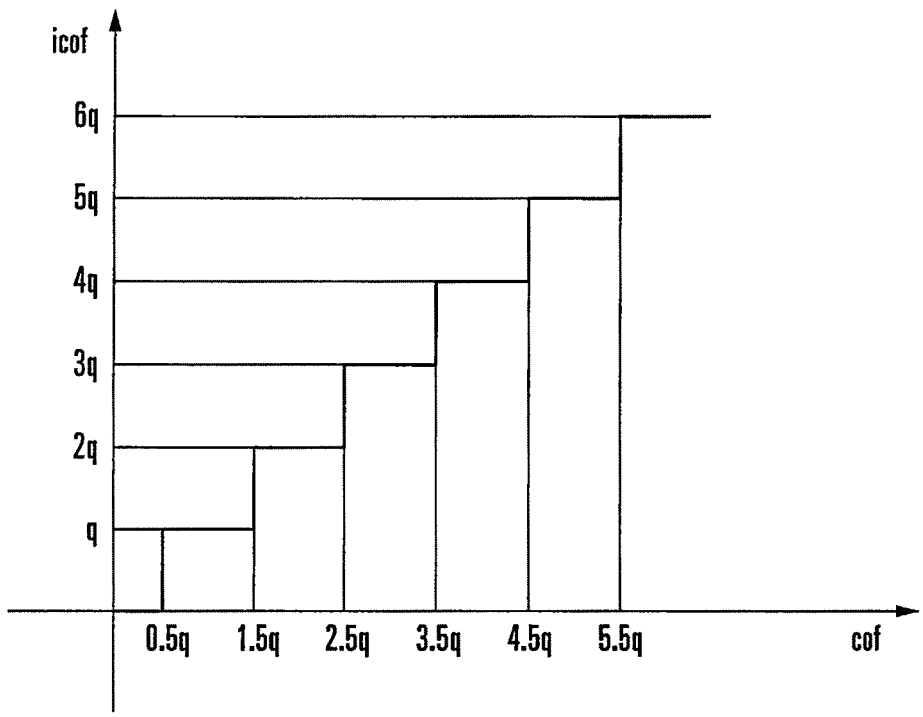
FIG. 7 is a view showing a quantization characteristic (quantization step size q) in a conventional scheme.

FIG. 7 shows a conventional quantization characteristic with a quantization step size q. FIG. 8 shows the quantization characteristic of the scheme according to the present invention with the quantization step size q and dead zone width dz=2q. FIG. 9 is a conventional quantization characteristic with a quantization step size q'=4q. (The characteristics shown in FIGS. 7 and 9 can also be called the quantization characteristics of the present invention with dead zone width dz=0). When the characteristics shown in FIGS. 7 and 8 are compared with each other, an output i_cof for the input cof smaller than dz=2q is set to 0 owing to the dead zone width dz. Referring to FIG. 9, the output i_cof for the input cof smaller than 2q is set to 0 owing to quantization with a four-fold quantization step size.

This means that an input equal to or less than the dead zone width dz is quantized with quantization step size q'=4q by the present invention without changing the quantization step size q.

In addition, the dead zone width need not be transmitted upon being added to a moving image bit stream.

That is, quantization can be arbitrarily performed for each transformation coefficient by changing the dead zone width dz for each transformation coefficient without adding any quantization additional information.

Quantization optimal for the visual sensitivity of a block or the visual sensitivity of a transformation coefficient in a block can be achieved by controlling the dead zone width dz in consideration of the pattern of the block, the prediction performance of the block, or the distribution of the orthogonal transformation coefficients in the block as well as the prediction mode of the block.

Figure 10:
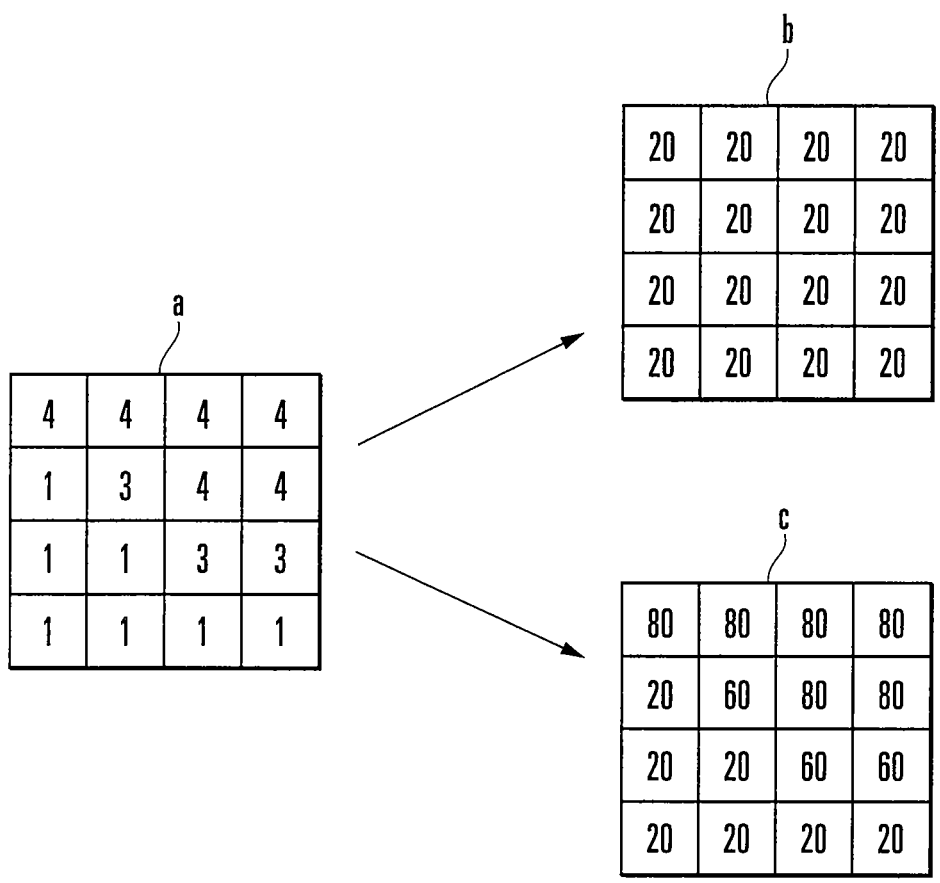
FIG. 10 is a view for explaining the effects of the present invention, with a representing the complexity (the smaller, the flatter) of each block, b representing a quantization strength in the conventional technique, and c representing a quantization strength in the present invention (quantization strength of MB=20)

Control can be performed in consideration of the pattern of a block/the prediction performance of a block without adding any quantization additional information by using the dead zone scale dz_scale supplied by the block dead zone scale generator 202 in the first embodiment of the present invention. That is, as shown in FIG. 10, quantization strength setting can be performed in accordance with the visual sensitivity of a block in a spatial domain.

According to the present invention, a quantization strength suitable for the visual sensitivity of a block in a spatial domain can be set. An unnecessary amount of codes generated for the block with low visual sensitivity can be reduced. This reduces the amount of codes generated in an entire image frame and decreases the overall quantization parameter of the image frame. As a consequence, a block with high visual sensitivity in a spatial domain can be quantized more finely than in the conventional scheme, and hence is encoded with higher image quality.

The first embodiment has been described above.

Second Embodiment

The second embodiment of the present invention will be described.

Figure 11:
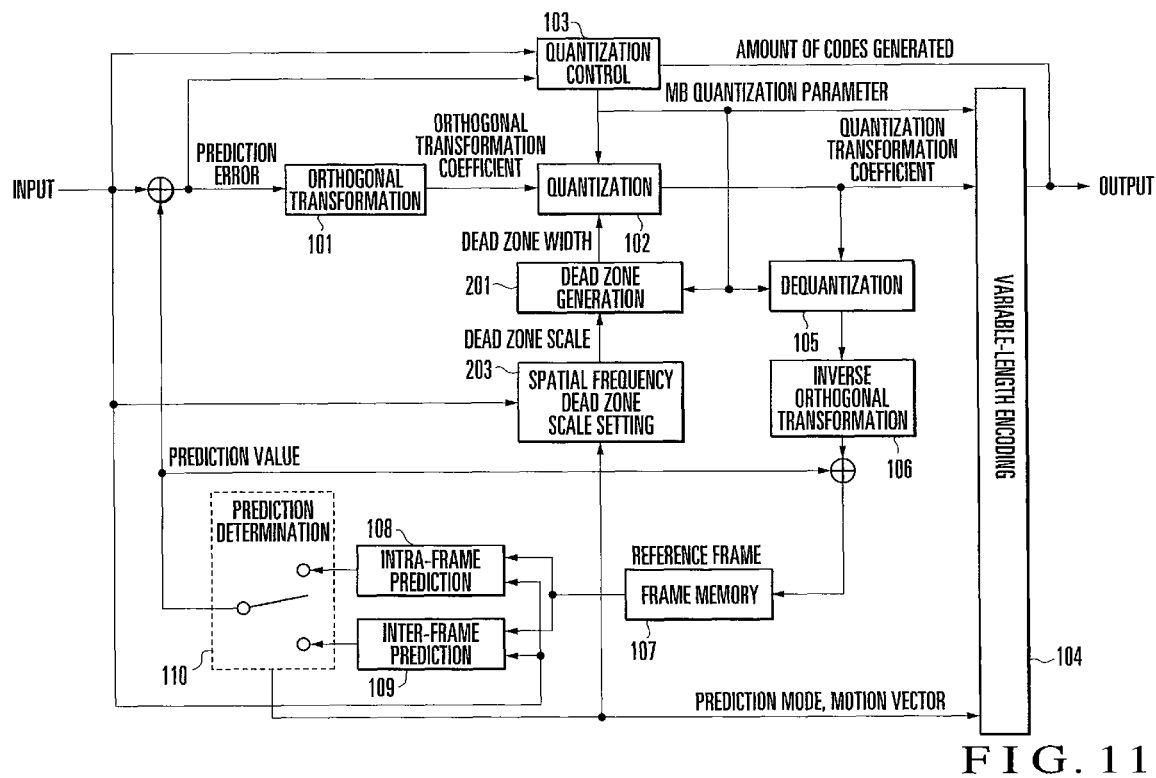
FIG. 11 is a view showing an example of the arrangement of the second embodiment.

FIG. 11 shows the arrangement of the second embodiment of the present invention. The arrangement of the second embodiment comprises a spatial frequency dead zone scale generator 203 in place of the block dead zone scale generator 202 in the arrangement of the first embodiment. The spatial frequency dead zone scale generator 203 supplies a dead zone scale dz_scale(b,i,j) ($0 \leq b \leq 15$, $0 \leq i \leq 3$, $0 \leq j \leq 3$) corresponding to the bth block in the raster scan order in an image frame to a dead zone generator 201.

For a concrete explanation, assume that in the following description, the size of an image frame is a QCIF (176×144) size, the size of an MB is a 16×16 size, and the size of a block is a 4×4 size. Obviously, however, the present invention can be applied a case wherein other sizes are used.

The spatial frequency dead zone scale generator 203 which is a characteristic feature of the second embodiment will be described below. Note that a detailed description of the same portions as those in the arrangement of the first embodiment will be omitted.

The spatial frequency dead zone scale generator 203 generates a dead zone scale suitable for the distribution of the orthogonal transformation coefficients of each block constituting an MB.

The input/output of the spatial frequency dead zone scale generator 203 will be described below.

Inputs to the spatial frequency dead zone scale generator 203 are an input image signal org(b,i,j) ($0 \leq b \leq 15$, $0 \leq i \leq 3$, $0 \leq j \leq 3$) corresponding to the bth block in the raster scan order in the MB currently processed by a quantization device 102, a prediction mode mode(b) ($0 \leq b \leq 15$) corresponding to the bth block in the raster scan order in the MB currently processed by the quantization device 102, and a motion vector mv(b,dir) ($0 \leq b \leq 15$, $0 \leq dir \leq 1$). In this case, dir indicates the direction of the motion vector, with 0 indicating the horizontal direction and 1 indicating the vertical direction.

The prediction modes include the intra-frame prediction mode (zero motion vector) of performing prediction from inside the same image frame, the inter-frame prediction mode (one motion vector) of performing prediction from one past or future image frame, and the bidirectional frame prediction mode (two motion vectors) of performing prediction from two future and past frames.

An output from the spatial frequency dead zone scale generator 203 is the dead zone scale dz_scale(b,i,j) ($0 \leq b \leq 15$, $0 \leq i \leq 3$, $0 \leq j \leq 3$) corresponding to the bth block in the raster scan order in the MB currently processed by the quantization device 102.

The input/output of the spatial frequency dead zone scale generator 203 has been described above.

FIG. 12 shows the internal arrangement of the spatial frequency dead zone scale generator 203. The operation of this generator will be described.

The spatial frequency dead zone scale generator 203 comprises a spatial frequency characteristic setting device 2031 and a characteristic type-specific dead zone scale device 2032.

The spatial frequency characteristic setting device 2031 outputs a characteristic type(b) ($0 \leq b \leq 15$, $0 \leq \text{type}(b) \leq 3$) corresponding to the distribution of the orthogonal transformation coefficients of the bth block in the raster scan order in the MB currently processed by the quantization device 102 by using an input image, prediction mode, and motion vector.

Figure 13:
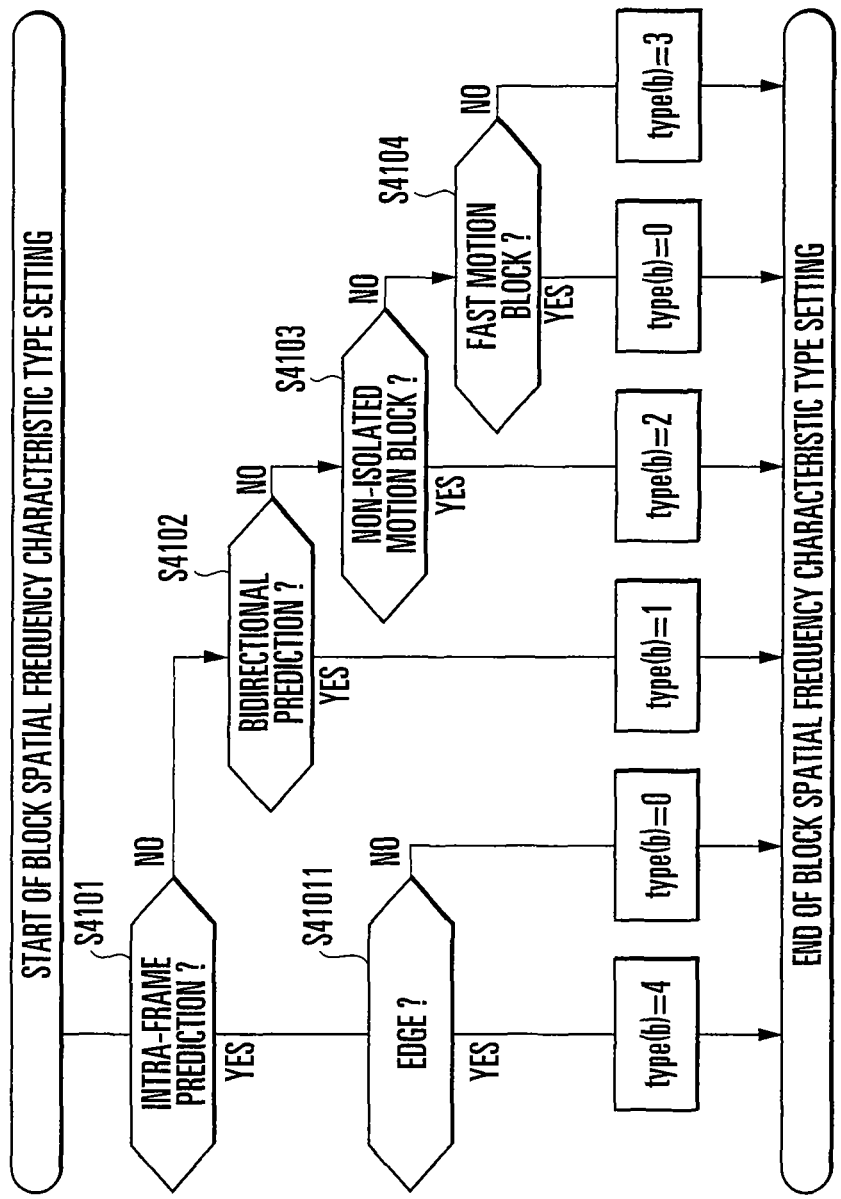
FIG. 13 is a flowchart showing the operation of a spatial frequency device characteristic type setting device.

The operation of the spatial frequency characteristic setting device 2031 will be described with reference to FIG. 13.

In step S4101, it is determined whether the prediction mode of the block b is the intra-frame prediction. If the intra-frame prediction is determined, step S41011 is executed.

In step S41011, if the value of equation (12) is larger than a predetermined threshold edge_th, it is determined that the block b has characteristic type(b)=4, and the processing is terminated. Otherwise, it is determined that the block b has characteristic type(b)=0, and the processing is terminated.

$$\text{Range} = \max\_v(b,i,j) - \min\_v(b,i,j) \quad (12)$$

where max_v(b,i,j) is a function of returning maximum pixel value org(b,i,j) ($0 \leq i \leq 3$, $0 \leq j \leq 3$) of the block b, and min_v(b,i,j) is a function of returning minimum pixel value org(b,i,j) ($0 \leq i \leq 3$, $0 \leq j \leq 3$) of the block b.

An intra-frame prediction block has prediction performance lower than that of inter-frame prediction, and hence causes a large prediction error.

If a block is a flat or texture block, it is preferable that the transformation coefficients of low-frequency components in the block be finely quantized, and the transformation coefficients of high-frequency components be coarsely quantized.

If the block is an edge, since subjectively important coefficients occur at high frequencies, the transformation coefficients of the respective frequencies are preferably quantized with uniform strength.

In step S4102, it is determined whether the prediction mode of the block b is the bidirectional prediction mode. If the bidirectional prediction mode is determined, it is determined that the block b has characteristic type(b)=1, and the processing is terminated. Otherwise, step S4103 is executed.

The inside of a bidirectional prediction block is a pan area or still area, which has high visual sensitivity. Note, however, that since a prediction error signal with small power is noise produced when a future or past frame is compressed, a quantization strength is preferably set so as to omit the prediction error signal with small power.

In step S4103, a dispersion msv of a motion vector mv(b, dire) ($0 \leq b \leq 15$, $0 \leq \text{dir} \leq 1$) of the block b is calculated by equation (13). If the dispersion of the motion vector is smaller than a predetermined motion vector dispersion threshold mvs_thres, it is determined that the block b has characteristic type(b)=2, and the processing is terminated. Otherwise, step S4104 is executed.

$$mvs = abs(mv(b,0) - u\_mv(b,0)) + abs(mv(b,1) - u\_mv(b,1)) + abs(mv(b,0) - l\_mv(b,0)) + abs(mv(b,1) - l\_mv(b,1)) \quad (13)$$

where abs(x) is a function of returning the absolute value of an input x, u_mv(b,dir) is a function of returning a motion vector mv in the dir direction of an adjacent block located on the upper side of the block b, and l_mv(b,dir) is a function of returning the motion vector mv in the dir direction of an adjacent block located on the left side of the block b.

A non-isolated motion block is a pan area or a still area, and hence has high visual sensitivity. Note, however, that since a prediction error signal with small power is noise produced when a future or past frame is compressed, a quantization strength is preferably set so as to omit the prediction error signal with small power.

In step S4104, it is determined whether a vertical and horizontal motion vector length mv(b,dir) ($0 \leq b \leq 15$, $0 \leq \text{dir} \leq 1$) of the block b is larger than a predetermined fast motion vector length threshold hs_mv_thres (is a fast motion block), or smaller than the threshold (is a normal motion block). If a fast motion block is determined, it is determined that the block b has characteristic type(b)=0. Otherwise, it is determined that the block b has characteristic type(b)=3. The processing is then terminated.

Motion prediction fails with respect to a fast motion block, and hence a large prediction error occurs as in the case of intra-frame prediction. However, since the motion is extremely fast and is difficult to follow by the human eye, a high quantization strength is preferably set for the transformation coefficients of high-frequency components as in the case of intra-frame prediction.

A normal motion block tends to have a smaller prediction error than in intra-frame prediction. It is therefore preferable that quantization strength setting for the transformation coefficients of high-frequency components be moderated more than in intra-frame prediction.

The characteristics of the transformation coefficients of the respective blocks can be classified by the processing in step S4101 to S4104.

The operation of the spatial frequency characteristic setting device 2031 has been described above.

The operation of the characteristic type-specific dead zone scale device 2032 will be described next.

The characteristic type-specific dead zone scale device 2032 calculates a dead zone scale dz_scale(b,i,j) ($0 \leq b \leq 15$, $0 \leq i \leq 3$, $0 \leq j \leq 3$) of the bth block in the raster scan order in the MB currently processed by the quantization device 102 from the characteristic type(b) corresponding to the bth block which is supplied from the spatial frequency characteristic setting device 2031. The following are methods of calculating the dead zone scale of the block b in accordance with the different characteristic types (type0 to type3):

type0 (intra-frame prediction block which is a non-edge or fast motion block)

$$dz\_scale(b,i,j) = B0(i,j) \quad (14)$$

type1 (bidirectional prediction block)

$$dz\_scale(b,i,j) = B1 \quad (15)$$

type2 (non-isolated motion block)

$$dz\_scale(b,i,j) = B2 \quad (16)$$

type3 (normal motion block)

$$dz\_scale(b,i,j) = B3(i,j) \quad (17)$$

type4 (intra-frame prediction block and edge)

$$dz\_scale(b,i,j) = B4 \quad (18)$$

In this case, B0, B1, B2, B3, and B4 are predetermined parameters. B0(i,j)={{0, 1.1, 1.3, 1.6}, {1.1, 1.3, 1.6, 1.8}, {1.3, 1.6, 1.8, 2.0}, {1.6, 1.8, 2.0, 2.8}}, and B3(x)={{0, 1.1, 1.3, 1.4}, {1.1, 1.3, 1.4, 1.6}, {1.3, 1.4, 1.6, 1.8}, {1.4, 1.6, 1.8, 2.0}}, and B4>B1>B2>1. Note that if the width bw of a block is a numerical value other than 4 in this embodiment, the values of B0 and B3 can be calculated by equation (19) as follows.

$$B(i,j)=K(i,j)\times(i^2+j^2)^{0.25} \quad (19)$$

where K(i,j) is a value which depends on a spatial frequency (i,j) and is larger than 1. Note that if the intra-frame prediction mode is set and a prediction direction pred_dir can be supplied from a prediction determination 110, the gradient of type(0) is preferably changed in accordance with the prediction direction pred_dir (vertical, horizontal, oblique, or the like). If, for example, the prediction direction is the horizontal direction, the pattern in a block is flat in the horizontal direction. Therefore, a dead zone scale dz_scale is preferably generated so as to quantize the quantization coefficients of the transformation coefficients corresponding to frequencies in a horizontal direction i more finely than the transformation coefficients of frequencies in a vertical direction j.

The operation of characteristic type-specific dead zone scale device 2032 and spatial frequency dead zone scale generator 203 has been described above.

Figure 14:
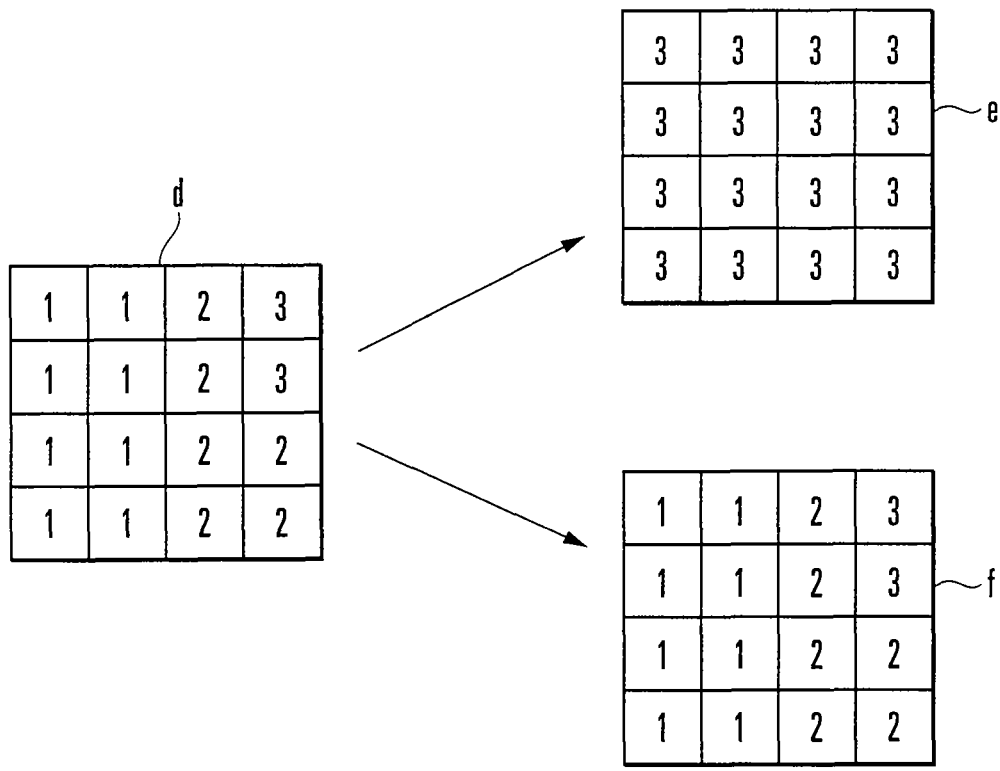
FIG. 14 is a view for explaining the effects of the present invention, with d representing a block spatial frequency characteristic type in an MB, e representing a quantization type in the conventional technique, and f representing a quantization type in the present invention ("1" representing a bidirectional prediction block, "2" representing a non-isolated motion block, and "3" representing a normal motion block)
Figure 15:
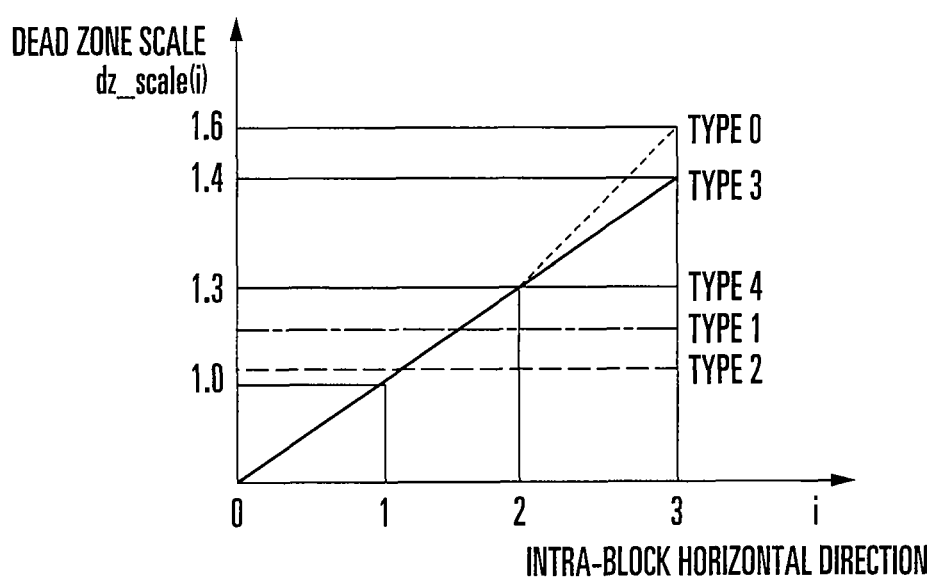
FIG. 15 is a view showing type-specific quantization strength characteristics (only in the intra-block horizontal direction)

According to the second embodiment of the present invention, a dead zone width corresponding to the distribution of the transformation coefficients of each block can be set by using the dead zone scale dz_scale supplied from the spatial frequency dead zone scale generator 203. That is, as shown in FIGS. 14 and 15, quantization can be performed in consideration of the visual sensitivity of each transformation coefficient in the frequency domain without adding any quantization additional information.

According to the present invention, a data zone corresponding to the distribution of the transformation coefficients of each block is set, and the amount of generated codes of transformation coefficients with low visual sensitivity in the frequency domain can be reduced. This makes it possible to reduce the amount of generated codes of an entire image frame and decrease the overall quantization parameter of the image frame. As a consequence, transformation coefficients with high visual sensitivity in a frequency domain are quantized more finely than in the conventional scheme, and hence encoding can be performed with higher image quality.

The second embodiment has been described above.

Third Embodiment

The third embodiment of the present invention will be described.

FIG. 16 shows the arrangement of the third embodiment of the present invention. The arrangement of the third embodiment comprises a hybrid dead zone scale generator 204 in place of the block dead zone scale generator 202 in the arrangement of the first embodiment. A spatial frequency dead zone scale generator 203 supplies a dead zone scale dz_scale(b,i,j) ($0 \leq b \leq 15$, $0 \leq i \leq 3$, $0 \leq j \leq 3$) corresponding to the bth block in the raster scan order in an image frame to a dead zone generator 201.

For concrete explanation, assume that in the following description, the size of an image frame is a QCIF (176×144) size, the size of an MB is a 16×16 size, and the size of a block forming an MB is a 4×4 size. Obviously, however, the present invention can be applied a case wherein other sizes are used.

In addition, the hybrid dead zone scale generator 204 as a characteristic feature of the third embodiment will be described below. Note that a detailed description of the same portions as those in the arrangement of the first embodiment will be omitted.

The hybrid dead zone scale generator 204 generates a dead zone scale suitable for the pattern of each block, the prediction performance of each block, and the distribution of the orthogonal transformation coefficients of each block.

The input/output and operation of the hybrid dead zone scale generator 204 will be described below.

Inputs to the hybrid dead zone scale generator 204 are a prediction mode mode(b) ($0 \leq b \leq 15$) corresponding to the bth block in the raster scan order in the MB currently processed by a quantization device 102, a motion vector mv(b,dir) ($0 \leq b \leq 15$, $0 \leq dir \leq 1$), an input image signal org(b,i,j) ($0 \leq b \leq 15$, $0 \leq i \leq 3$, $0 \leq j \leq 3$), and a prediction error signal pd(b,i,j) ($0 \leq b \leq 15$, $0 \leq i \leq 3$, $0 \leq j \leq 3$).

An output from the hybrid dead zone scale generator 204 is a dead zone scale dz_scale(b,i,j) ($0 \leq b \leq 15$, $0 \leq i \leq 3$, $0 \leq j \leq 3$) corresponding to the bth block in the raster scan in the MB currently processed by the quantization device 102.

Figure 17:
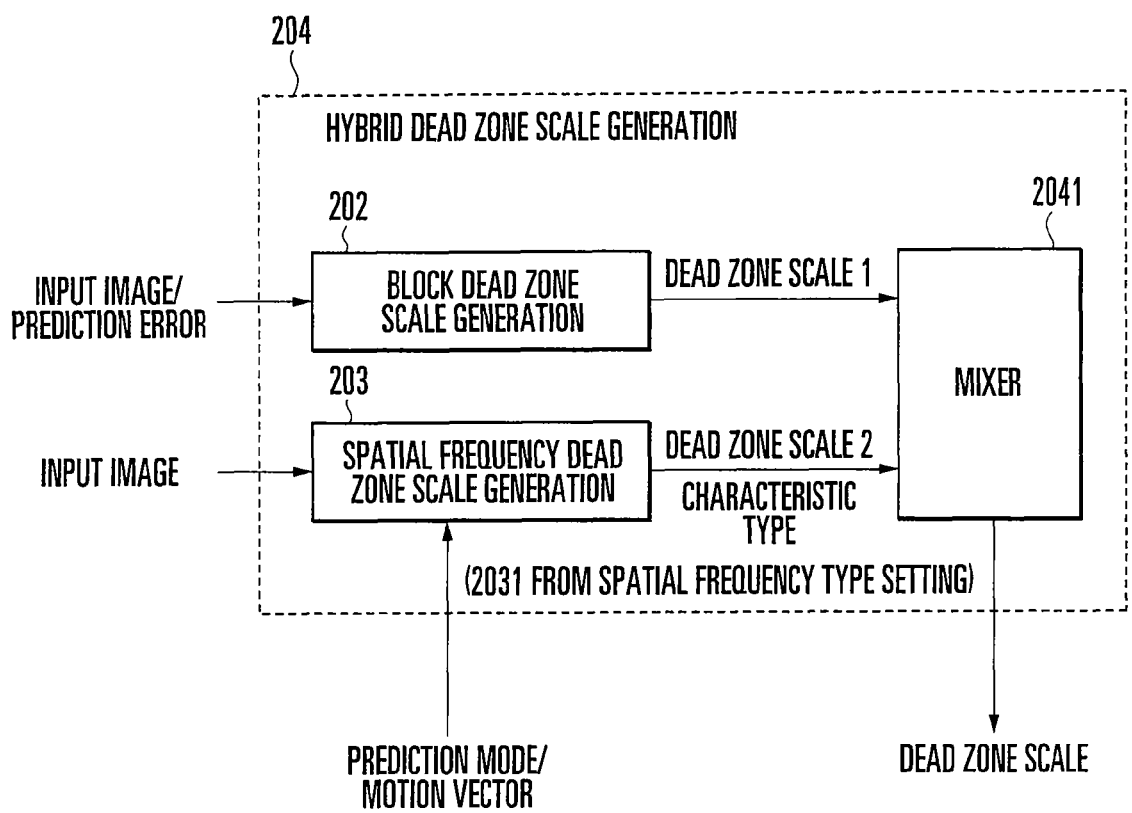
FIG. 17 is a view showing an example of the arrangement of a hybrid dead zone scale generator.

FIG. 17 shows the internal arrangement of the hybrid dead zone scale generator 204. The operation of this generator will be described below.

As shown in FIG. 17, the hybrid dead zone scale generator 204 comprises a block dead zone scale generator 202, spatial frequency dead zone scale generator 203, and mixer 2041.

The block dead zone scale generator 202 is identical to that described in the first embodiment, and the spatial frequency dead zone scale generator 203 is identical to that described in the second embodiment.

Only the input/output and operation of the mixer 2041 will therefore be described below.

Inputs to the mixer 2041 are a dead zone scale 1dz_scale 1(b,i,j) ($0 \leq b \leq 15$, $0 \leq i \leq 3$, $0 \leq j \leq 3$) corresponding to the bth block in the raster scan order in the MB currently processed by the quantization device 102 which is supplied from the block dead zone scale generator 202, a dead zone scale 2dz_scale 2(b,i,j) ($0 \leq b \leq 15$, $0 \leq i \leq 3$, $0 \leq j \leq 3$) corresponding to the bth block in the raster scan order in the MB currently processed by the quantization device 102 which is supplied from the spatial frequency dead zone scale generator 203, and a characteristic type(b) ($0 \leq b \leq 15$, $0 \leq type(b) \leq 3$) indicating the distribution of the transformation coefficients of the bth block in the raster scan order in the MB currently processed by the quantization, device 102 which is supplied from the spatial frequency dead zone scale generator 203.

An output from the mixer 2041 is the dead zone scale dz_scale(b,i,j) ($0 \leq b \leq 15$, $0 \leq i \leq 3$, $0 \leq j \leq 3$) corresponding to the bth block in the raster scan order in the MB currently processed by the quantization device 102.

The mixer 2041 calculates the dead zone scale dz_scale(b,i,j) in accordance with the characteristic type type(b) of the block b.

type0 (intra-frame prediction block which is a non-edge or fast motion block)

$$dz\_scale(b,i,j)=dz\_scale1(b,i,j) \times dz\_scale2(b,i,j) \quad (20)$$

type1 (bidirectional prediction block)

$$dz\_scale(b,i,j)=\max(dz\_scale1(b,i,j), dz\_scale2(b,i,j)) \quad (21)$$

type2 (non-isolated motion block)

$$dz\_scale(b,i,j)=\max(dz\_scale1(b,i,j), dz\_scale2(b,i,j)) \quad (21)$$

type3 (normal motion block)

$$dz\_scale(b,i,j)=dz\_scale1(b,i,j) \times dz\_scale2(b,i,j) \quad (20)$$

type4 (intra-frame prediction block and edge)

$$dz\_scale(b,i,j)=\max(dz\_scale1(b,i,j), dz\_scale2(b,i,j)) \quad (21)$$

The operations of the mixer 2041 and hybrid dead zone scale generator 204 have been described above.

The present invention can perform quantization suitable for the visual sensitivity (pattern, prediction performance) of a block in a spatial zone and the visual sensitivity (distribution) of transformation coefficients in a frequency zone. This makes it possible to reduce the amount of generated codes of an entire image frame and decrease the overall quantization parameter of the image frame. As a consequence, a block with high visual sensitivity in a spatial domain and transformation coefficients with high visual sensitivity in a frequency domain are quantized more finely than in the conventional scheme, and hence encoding can be performed with higher image quality.

The third embodiment has been described above.

Fourth Embodiment

The fourth embodiment of the present invention will be described.

Figure 18:
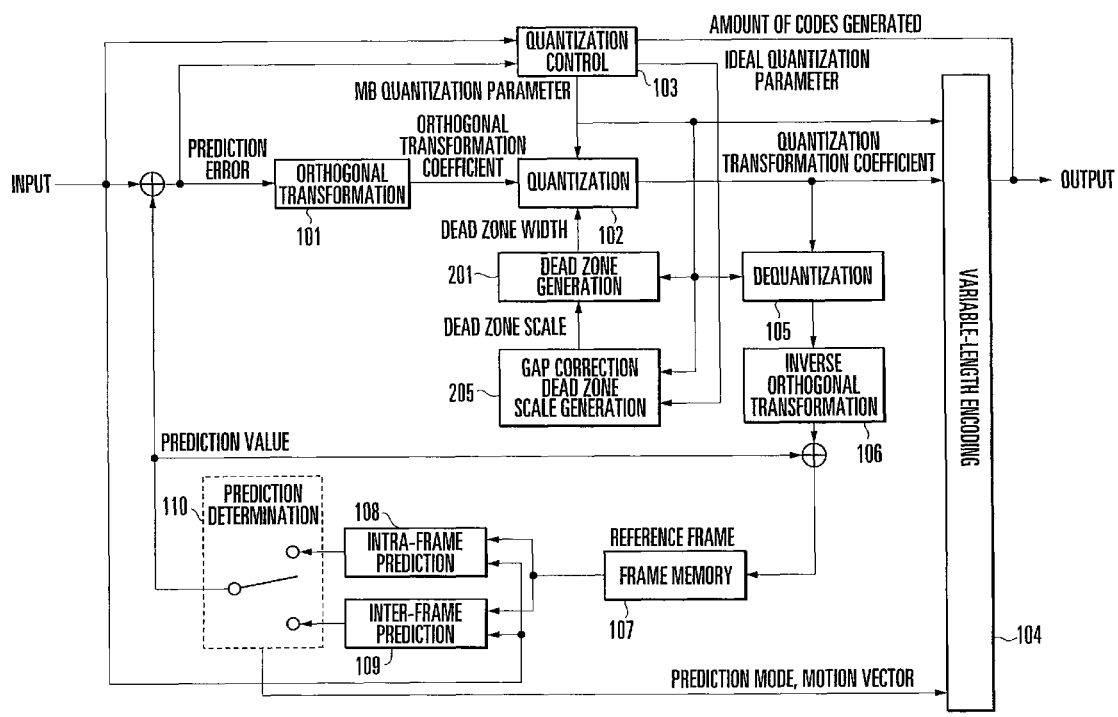
FIG. 18 is a view showing an example of the arrangement of the fourth embodiment.

FIG. 18 shows the arrangement of the fourth embodiment of the present invention. The arrangement of the fourth embodiment comprises a gap correction dead zone scale generator 205 in place of the block dead zone scale generator 202 in the arrangement of the first embodiment. The gap correction dead zone scale generator 205 supplies a dead zone scale dz_scale(b,i,j) (0≤b≤15, 0≤i≤3, 0≤j≤3) corresponding to the bth block in the raster scan order in an image frame to a dead zone generator 201.

For a concrete explanation, assume that in the following description, the size of an image frame is a QCIF (176×144) size, the size of an MB is a 16×16 size, and the size of a block forming an MB is a 4×4 size. Obviously, however, the present invention can be applied a case wherein other sizes are used.

The input/output and operation of the gap correction dead zone scale generator 205 will be described below.

Inputs to the gap correction dead zone scale generator 205 are a real quantization parameter mb_q of the MB currently processed by a quantization device 102 which is supplied from a quantization control device 103 and an ideal quantization parameter ideal_q of the MB currently processed by the quantization device 102 which is supplied from the quantization control device 103.

An output from the gap correction dead zone scale generator 205 is a dead zone scale dz_scale(b,i,j) (0≤b≤15, 0≤i≤3, 0≤j≤3)) corresponding to the bth block in the raster scan in the MB currently processed by the quantization device 102.

Figure 19:
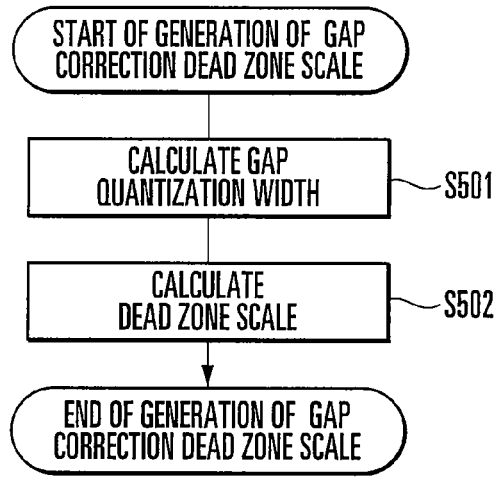
FIG. 19 is a flowchart showing the operation of a gap correction dead zone scale generator.

The operation of the gap correction dead zone scale generator 205 will be described next with reference to FIG. 19.

In step S501, a gap quantization width qstep_gap between the real quantization parameter mb_q and the ideal quantization parameter ideal_q is calculated by using equation (22). Note that the quantization step size mb_q_step to be commonly used below is set by mb_q step=q_step_table[q]. The quantization step size q_step_table[q] is a quantization step size corresponding to a quantization parameter q defined by a base encoder (Q_MIN≤p≤Q_MAX; both Q_MIN and Q_MAX depend on the base encoder).

$$qstep\_gap = \begin{cases} 0 & \text{if } mb\_q \geq ideal\_q \\ mb\_q\_step[ideal\_q]/mb\_q\_step[mb\_q] & \text{else} \end{cases} \quad (22)$$

In step S502, the dead zone scale dz_scale(b,i,j) is calculated from the gap quantization width qste_gap by using equation (23):

$$dz\_scale(b,i,j) = qstep\_gap \quad (23)$$

The input/output and operation of the gap correction dead zone scale generator 205 have been described above.

When the following two problems arise in the base encoder due to the effect of the gap correction dead zone scale generator 205, the gap between ideal MB quantization strength and real MB quantization strength can be corrected.

One problem is that the prediction mode of an MB which is selected by a prediction determination 110 of the base encoder cannot transmit the quantization parameter of the current MB or the difference from the quantization parameter of the MB, and the ideal MB quantization parameter of the quantization control device 103 of the base encoder is larger than the real MB quantization parameter.

The other problem is that a limitation is imposed on a difference delta_mb_Q from the quantization parameter of the current MB which can be transmitted to the base encoder for each BM (e.g., −2≤delta_mb_Q≤2), and the ideal MB quantization parameter of the quantization control device 103 of the base encoder is larger than the real MB quantization parameter.

Correcting the quantization strength gap as described above makes it possible to reduce the amount of codes wastefully consumed for an MB with low visual sensitivity. By reducing the amount of codes, the quantization parameter of the entire image frame is reduced, and an MB with high visual sensitivity can be quantized more finely. According to the present invention, therefore, encoding can be performed with higher image quality than in the conventional scheme.

The fourth embodiment has been described above.

Fifth Embodiment

The fifth embodiment of the present invention will be described.

As is also obvious from the above description, an image encoding device according to the present invention can be implemented by a computer program as well as being implemented by hardware.

Figure 20:
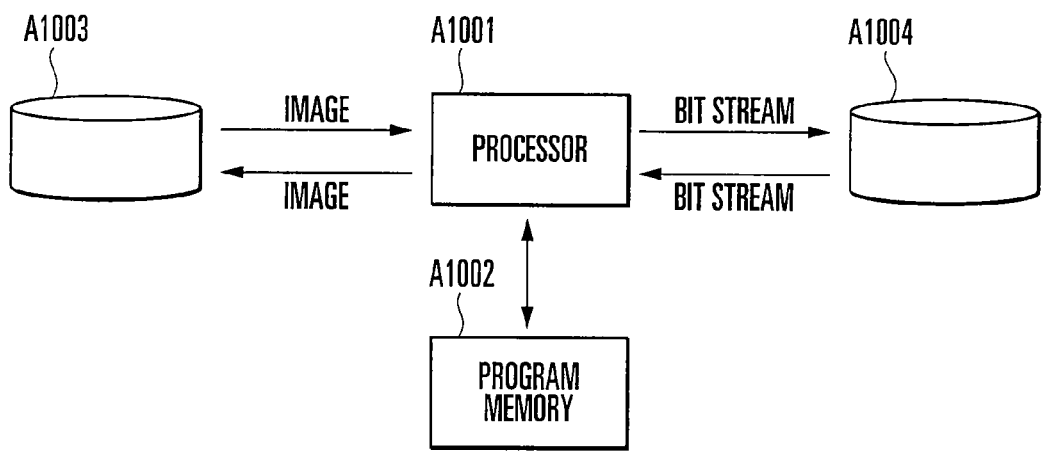
FIG. 20 is a view showing the arrangement of an information processing device using the present invention.

FIG. 20 is a general block diagram showing the arrangement of an information processing system which implements a moving image encoding device according to the present invention.

The information processing system (computer) shown in FIG. 20 comprises a processor A1001, program memory A1002, and storage media A1003 and A1004. The storage media A1003 and A1004 may be discrete storage media or may be storage areas in the same storage medium. As a storage medium, a magnetic storage medium such as a hard disk can be used.

As has been described above, the present invention comprises the means for setting a dead zone width corresponding to the visual sensitivity of a transformation coefficient in a frequency domain or the visual sensitivity of a block comprising a plurality of transformation coefficients as constituent elements in a spatial domain in the transform encoding technique for images. This makes it possible to provide a quantization function corresponding to the visual sensitivity of a transformation coefficient in a frequency domain and the visual sensitivity of a block comprising a plurality of transformation coefficients as constituent elements in a spatial domain.

In addition, the present invention can reduce the amount of codes wastefully consumed for a transformation coefficient with low visual sensitivity in a frequency domain and a block with low visual sensitivity in a spatial domain independently of the quantization width determined by a quantization parameter. Reducing the amount of codes makes it possible to quantize an entire image frame more finely than in the conventional scheme and encode a transformation coefficient with high visual sensitivity in a frequency domain and a block with high visual sensitivity in a spatial domain with high image quality.

The invention claimed is:

1. An image encoding method comprising:
generating a transformation coefficient for each block by transforming an image from a spatial domain into a frequency domain for each block, characterized by comprising the step of quantizing the plurality of transformation coefficients for each block upon setting the same quantization width in the plurality of blocks, wherein the step of quantizing comprises the steps of analyzing visual sensitivities of the plurality of blocks, determining the quantization width in accordance with a block exhibiting high visual sensitivity, setting a dead zone width larger than a dead zone width of the block exhibiting high visual sensitivity to a block with lower visual sensitivity, and quantizing the transformation coefficient; and
calculating the dead zone width from at least one of a prediction mode of the image, a direction of intra frame prediction of the image, motion of the image, a direction of inter frame prediction of the image, an average absolute error of the image, a variance of the image, an image range of the image, an average absolute error of a prediction error signal of the image, and a variance of a prediction error signal of the image.

2. An image encoding method comprising:
generating a transformation coefficient for each block by transforming an image from a spatial domain into a frequency domain for each block, characterized by comprising the step of quantizing the plurality of transformation coefficients for each block upon setting the same quantization width in the plurality of blocks, wherein the step of quantizing comprises the steps of analyzing visual sensitivities of the plurality of blocks, determining the quantization width in accordance with a block exhibiting high visual sensitivity, setting a dead zone width larger than a dead zone width of the block exhibiting high visual sensitivity to a block with lower visual sensitivity, and quantizing the transformation coefficient; and
calculating the dead zone width from one of a minimum value of an average absolute error of each of a target block and a neighboring block, a minimum value of a variance of the image of each of the target block and the neighboring block, and a minimum value of an image range of the image of each of the target block and the neighboring block.

3. An image encoding method which comprises the step of generating a transformation coefficient for each block by transforming an image from a spatial domain into a frequency domain for each block, characterized by comprising the steps of calculating an ideal quantization parameter for encoding an input moving image with preferable image quality, generating a dead zone scale based on a ratio of a quantization step size of the ideal quantization parameter to a quantization step size of a quantization parameter used for encoding output, and setting a dead zone width correspondingly with the dead zone scale to quantize a quantization coefficient.

4. An image encoding apparatus which comprises transformation means for generating a transformation coefficient for each block by transforming an image from a spatial domain into a frequency domain for each block, characterized by comprising quantization means for quantizing the plurality of transformation coefficients for each block upon setting the same quantization width in the plurality of blocks, wherein said quantization means comprises dead zone generating means for analyzing visual sensitivities of the plurality of blocks, determining the quantization width in accordance with a block exhibiting high visual sensitivity, setting a dead zone width larger than a dead zone width of the block exhibiting high visual sensitivity to a block with lower visual sensitivity, and quantizing the transformation coefficient,
characterized in that said dead zone generating means further comprises dead zone scale generating means for calculating the dead zone width from at least one of a prediction mode of the image, a direction of intra frame prediction of the image, motion of the image, a direction of inter frame prediction of the image, an average absolute error of the image, a variance of the image, an image range of the image, an average absolute error of a prediction error signal of the image, and a variance of a prediction error signal of the image.

5. An image encoding apparatus which comprises transformation means for generating a transformation coefficient for each block by transforming an image from a spatial domain into a frequency domain for each block, characterized by comprising quantization means for quantizing the plurality of transformation coefficients for each block upon setting the same quantization width in the plurality of blocks, wherein said quantization means comprises dead zone generating means for analyzing visual sensitivities of the plurality of blocks, determining the quantization width in accordance with a block exhibiting high visual sensitivity, setting a dead zone width larger than a dead zone width of the block exhibiting high visual sensitivity to a block with lower visual sensitivity, and quantizing the transformation coefficient,
characterized in that said dead zone generating means further comprises dead zone scale generating means for calculating the dead zone width from one of a minimum value of an average absolute error of each of a target block and a neighboring block, a minimum value of a variance of the image of each of the target block and the neighboring block, and a minimum value of an image range of the image of each of the target block and the neighboring block.

6. An image encoding apparatus which comprises transformation means for generating a transformation coefficient for each block by transforming an image from a spatial domain into a frequency domain for each block, characterized by comprising quantization control means for calculating an ideal quantization parameter for encoding an input moving image with preferable image quality, dead zone scale generating means for generating a dead zone scale based on a ratio of a quantization step size of the ideal quantization parameter to a quantization step size of a quantization parameter used for encoding output, and quantization means for setting a dead zone width correspondingly with the dead zone scale to quantize a quantization coefficient.

7. A non-transitory computer-readable medium that causes a computer to function as transformation means for generating a transformation coefficient for each block by transforming an image from a spatial domain into a frequency domain for each block, quantization means for setting a dead zone, and quantizing the plurality of transformation coefficients for each block by using the same quantization width, and dead zone generating means for analyzing visual sensitivities of the plurality of blocks, determining the quantization width in accordance with a block exhibiting high visual sensitivity, and setting a dead zone width larger than a dead zone width of the block exhibiting high visual sensitivity to a block with lower visual sensitivity, characterized in that the dead zone generating means further comprises dead zone scale generating means for calculating the dead zone width from at least one of a prediction mode of the image, a direction of intra frame prediction of the image, motion of the image, a direction of inter frame prediction of the image, an average absolute error of the image, a variance of the image, an image range of the image, an average absolute error of a prediction error signal of the image, and a variance of a prediction error signal of the image.

8. A non-transitory computer-readable medium that causes a computer to function as transformation means for generating a transformation coefficient for each block by transforming an image from a spatial domain into a frequency domain for each block, quantization means for setting a dead zone, and quantizing the plurality of transformation coefficients for each block by using the same quantization width, and dead zone generating means for analyzing visual sensitivities of the plurality of blocks, determining the quantization width in accordance with a block exhibiting high visual sensitivity, and setting a dead zone width larger than a dead zone width of the block exhibiting high visual sensitivity to a block with lower visual sensitivity, characterized in that the dead zone generating means further comprises dead zone scale generating means for calculating the dead zone width from one of a minimum value of an average absolute error of each of a target block and a neighboring block, a minimum value of a variance of the image of each of the target block and the neighboring block, and a minimum value of an image range of the image of each of the target block and the neighboring block.

9. A non-transitory computer-readable medium that causes a computer to function as transformation means for generating a transformation coefficient for each block by transforming an input moving image from a spatial domain into a frequency domain for each block, quantization control means for calculating an ideal quantization parameter for encoding the input moving image with preferable image quality, dead zone scale generating means for generating a dead zone scale based on a ratio of a quantization step size of the ideal quantization parameter to a quantization step size of a quantization parameter used for encoding output, and quantization means for setting a dead zone width correspondingly with the dead zone scale to quantize a quantization coefficient.

* * * * *